Jan. 17, 1961

J. T. RAUEN 2,968,297

INDUCTION SYSTEM

Filed March 17, 1958

INVENTOR.
John T. Rauen.
BY
Balluff and McKinley
ATTORNEYS.

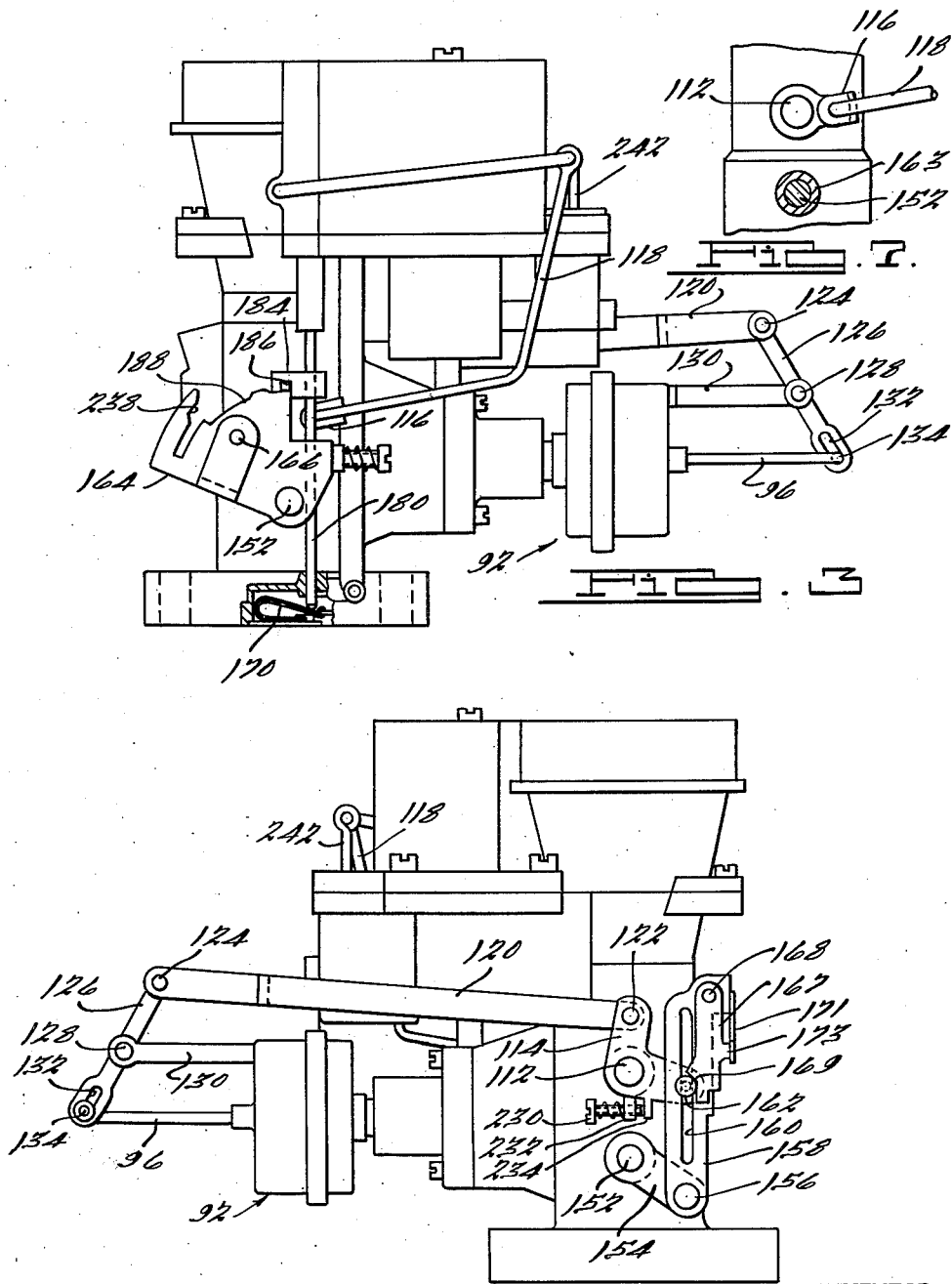

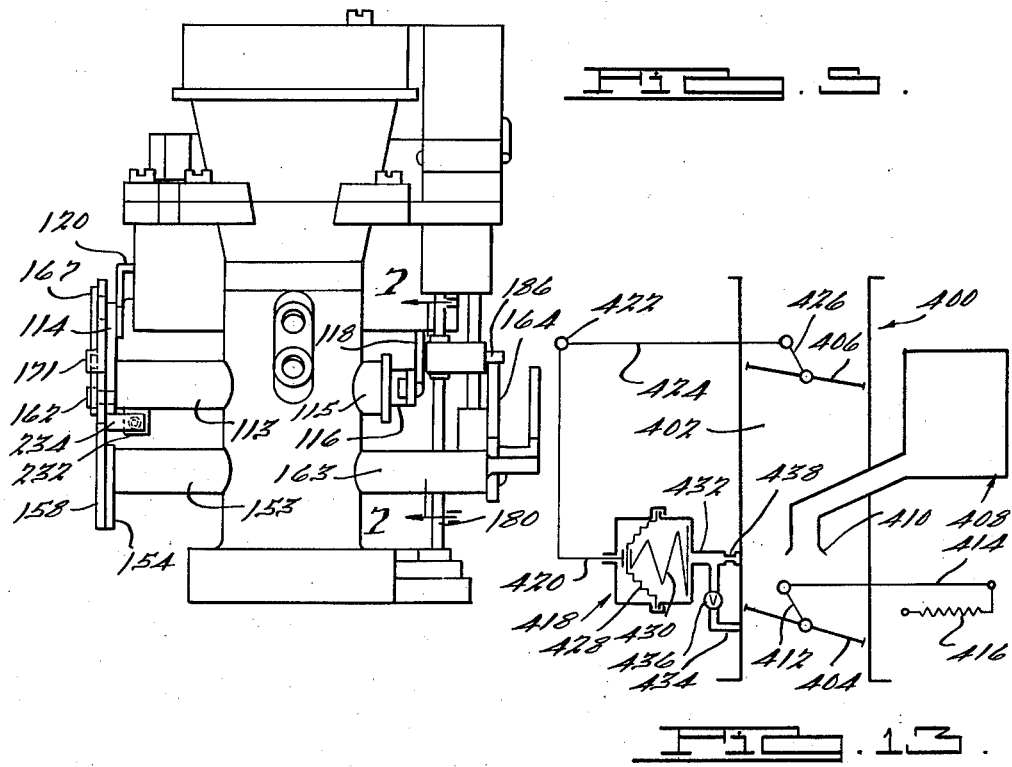
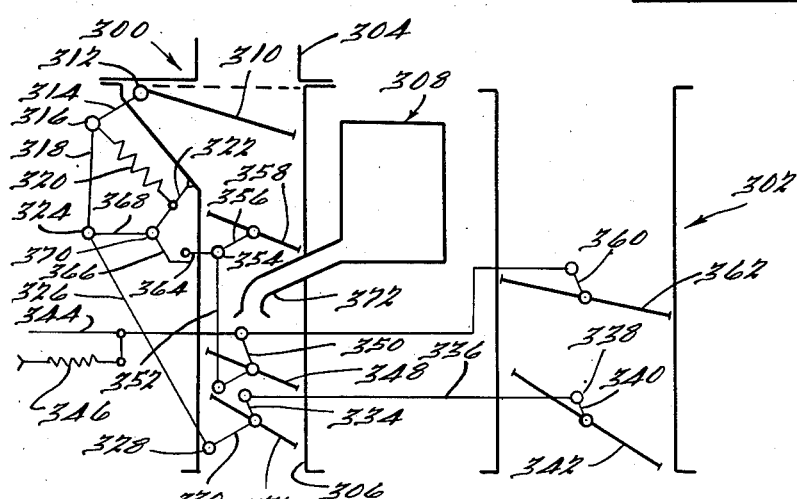

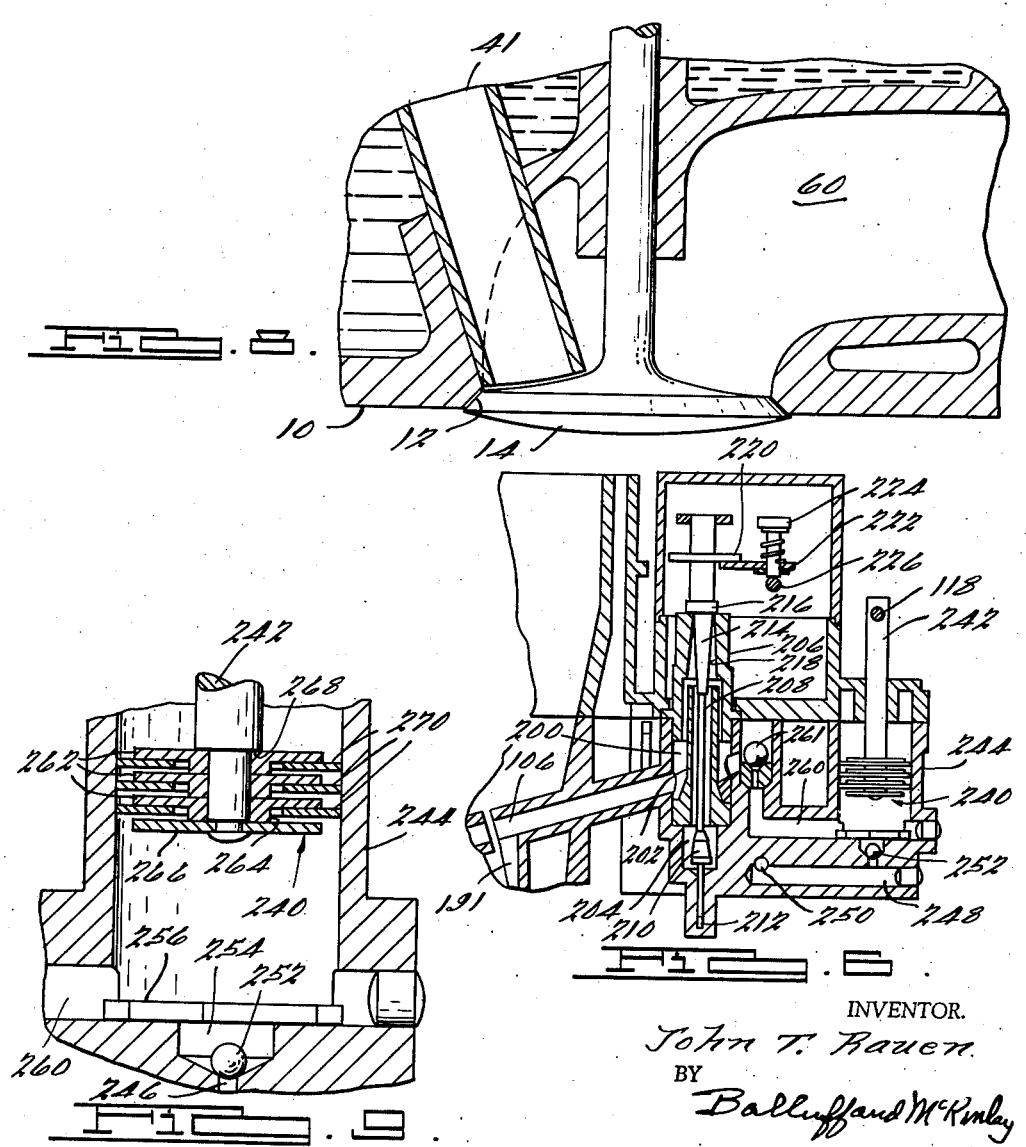

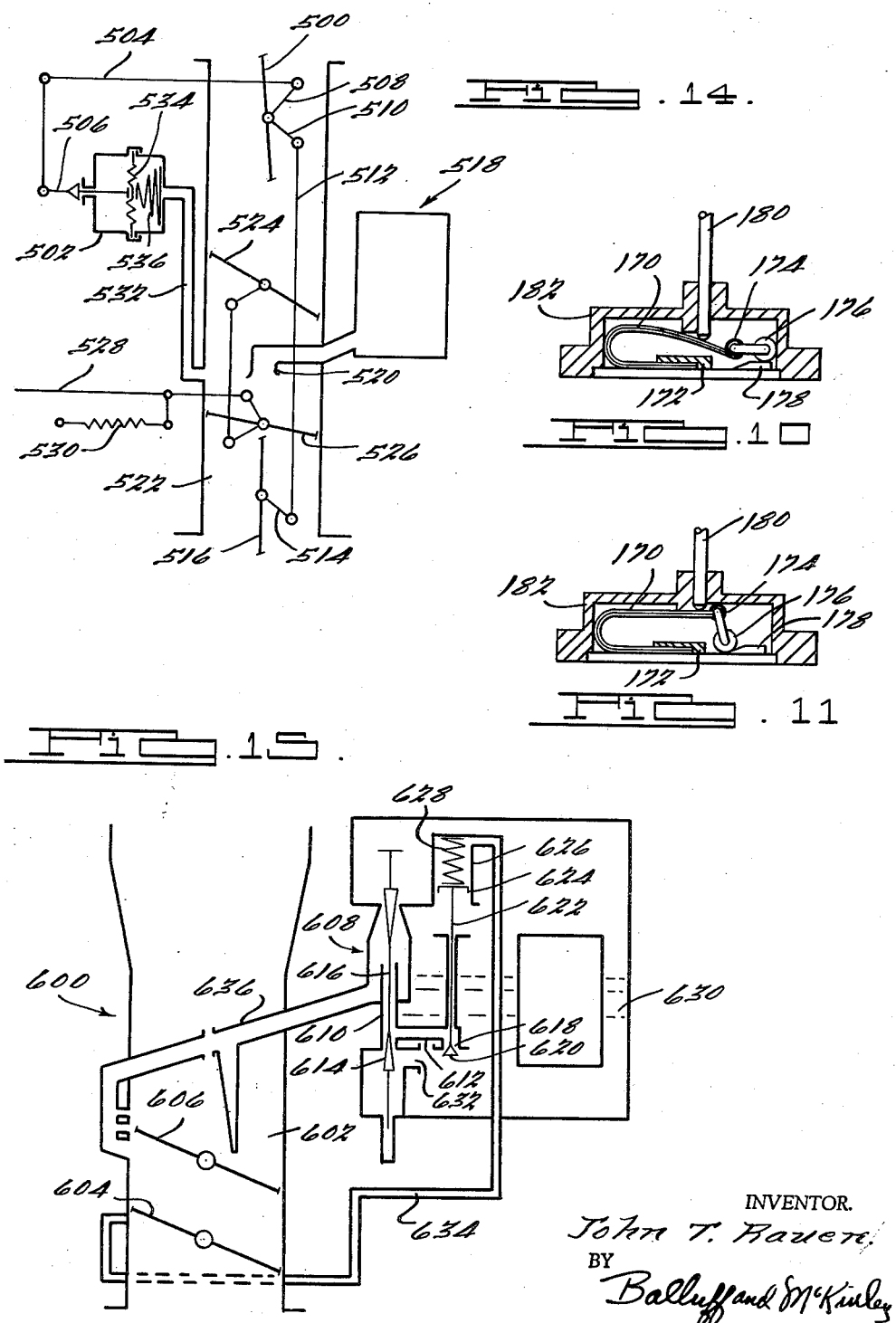

INVENTOR.
John T. Rauen.
BY
Ballugg & McKinley
ATTORNEYS.

United States Patent Office 2,968,297
Patented Jan. 17, 1961

2,968,297
INDUCTION SYSTEM
John T. Rauen, 6190 Lodewyck, Detroit, Mich.
Filed Mar. 17, 1958, Ser. No. 721,791
48 Claims. (Cl. 123—119)

This invention relates to the supplying of fuel and air to internal combustion engines and has particular reference to a new and useful improvement in an induction system and in carburetors suitable for use therein.

Principal objects of the invention are to provide:

An induction system having a fuel source from which fuel is supplied in equal amounts to each cylinder of a multi-cylinder engine, thereby obtaining increased engine power and fuel economy.

An induction system in which liquid fuel is converted to a substantially gaseous state and maintained in a gaseous state as it flows through the induction system to the engine cylinders, thereby eliminating the objectionable features of present induction systems in which the fuel is at least in part maintained in the liquid state. Prominent among the objectionable features of present induction systems are unequal fuel distribution to engine cylinders and engine stalling upon quick closing of the throttle following full opening thereof at low engine speed, due to the presence of an unavoidable relatively large quantity of unusable liquid fuel in the induction system at such occurrences.

An induction system in which air is supplied to the engine cylinders at substantially ambient temperatures, and therefore at the highest density that can be obtained without supercharging the engine, during full open throttle engine operation.

An induction system in which air is supplied to the engine cylinders at substantially atmospheric pressure during full open throttle operation to obtain, without supercharging, higher engine speeds and power than can be obtained with conventional induction systems.

An induction system having means for automatically maintaining a specific minimum vacuum in the induction system to obtain adequate fuel feeding, thereby preventing an objectionable characteristic of conventional induction systems, namely, stalling of the engine while endeavoring to sustain engine operation at low speeds with the throttle full open, or in an open position at which the induction system vacuum approaches zero.

An induction system adapted to obtain, with only a single carburetor, a power output from a given engine equally as high as that which can be obtained from the same engine utilizing a conventional induction system with multiple carburetors.

An automotive induction system that is less expensive and yet provides better engine performance than conventional automotive induction systems.

An induction system for an automotive engine which is very compact and thereby capable of being positioned on the engine in such manner as to permit lower vehicle hood levels.

An induction system having provisions for heating a small amount of the air and all of the fuel required by the engine, to convert the fuel to a gaseous state and to deliver the same in a substantially gaseous state to the cylinder intake ports, and including provisions for delivering a larger quantity of unheated air to the intake ports and for shielding the heated mixture from the cooler air to prevent chilling and consequent condensation of the heated mixture before entry to the cylinder, thereby obtaining a homogeneous fuel-air mixture of the greatest practical density in the cylinder for maximum power so that leaner economy mixtures can be properly and consistently fired.

An induction system having means for preventing icing conditions at the induction system throttle valves which can result from the refrigerating action caused by atomization of liquid fuel by unconditioned incoming air.

An induction system for a carbureted internal combustion engine providing, with less installation space, less operational difficulties and maintenance expense, and at lower manufacturing cost, all of the improved engine performance and benefits, including higher power output and better fuel economy, heretofore attributable only to "fuel injection" induction systems.

An induction system including a thermostatically controlled heat exchanger for raising the temperature of a small amount of the air required by the engine prior to its entry into a carburetor forming a part of the induction system, to prevent possible freezing of moisture in the intake air and the consequent accumulation of ice upon the carburetor fuel nozzle and the induction system throttles, and including means for heating such quantity of air and the fuel supplied thereto by the carburetor, to convert the fuel to a gaseous state prior to its entry into the engine cylinders at all speeds and related power outputs of the engine, and further including an unheated air passage for conveying to the cylinders at substantially ambient temperatures, the remaining large portion of the air required by the engine.

An induction system for a carbureted internal combustion engine capable of providing greater fuel economy and other improved results by provisions for heating the fuel to a gaseous state to assure equal distribution of fuel to all cylinders of a multi-cylinder engine.

An induction system including a small heated intake passage and a large unheated intake passage, both containing a manually operated throttle and a throttle automatically operable responsive to vacuum in the induction system as regulated by manual throttle movement, to provide superior engine performance.

An automotive induction system having provisions for preventing fuel flow into the induction passage when the engine is decelerating with a closed throttle, thereby further improving fuel economy and reducing exhaust fumes contributing to smog conditions.

An induction system providing gaseous fuel to an engine whereby a lesser volume of fuel for accomplishing lively vehicle acceleration is required than for similar vehicle acceleration with conventional or "wet" induction systems, whereby fuel is further economized.

An induction system providing gaseous fuel to an engine whereby following cold starting quicker conditioning of the induction system enables shorter engine warming-up periods, fuel economizing, reduction of harmful engine lubricant dilution, reduction of associated harmful acid formation in lubricants, and livelier engine performance during such periods.

A new and improved induction system which is simple in construction, more efficient, and more dependable in operation and provides better engine performance.

Other and further objects of the invention will be apparent from the following description and claims and will be understood by reference to the accompanying drawings, of which there are six sheets, which by way of illustration show preferred embodiments and the principles thereof and what I now consider to be the best mode in which I have contemplated applying those principles. Other embodiments of the invention embodying the same or equivalent principles may be made as desired by those skilled in the art without departing from the present invention and the purview of the appended claims.

In the drawings:

Fig. 3 is an elevational view of the carburetor shown in Fig. 2;

Fig. 4 is an elevational view of the opposite side of the carburetor;

Fig. 5 is an end elevational view of the carburetor;

Fig. 6 is a sectional view of the metering system of the carburetor;

Fig. 7 is a view taken along line 7—7 of Fig. 5;

Fig. 8 illustrates detail construction of the invention at the engine cylinder intake valve;

Fig. 9 illustrates a novel accelerator pump piston;

Fig. 10 is an enlarged sectional view of the carburetor thermostat shown in the "cold" position;

Fig. 11 is a view similar to Fig. 9 but showing the thermostat in the "hot" position;

Fig. 12 is a diagrammatic view of a modified form of carburetor;

Fig. 13 is a diagrammatic view of another modification of the carburetor portion of the invention;

Fig. 14 is a diagrammatic view of another modification of the invention;

Fig. 15 is a diagrammatic view of another modification of the invention;

Figure 1:
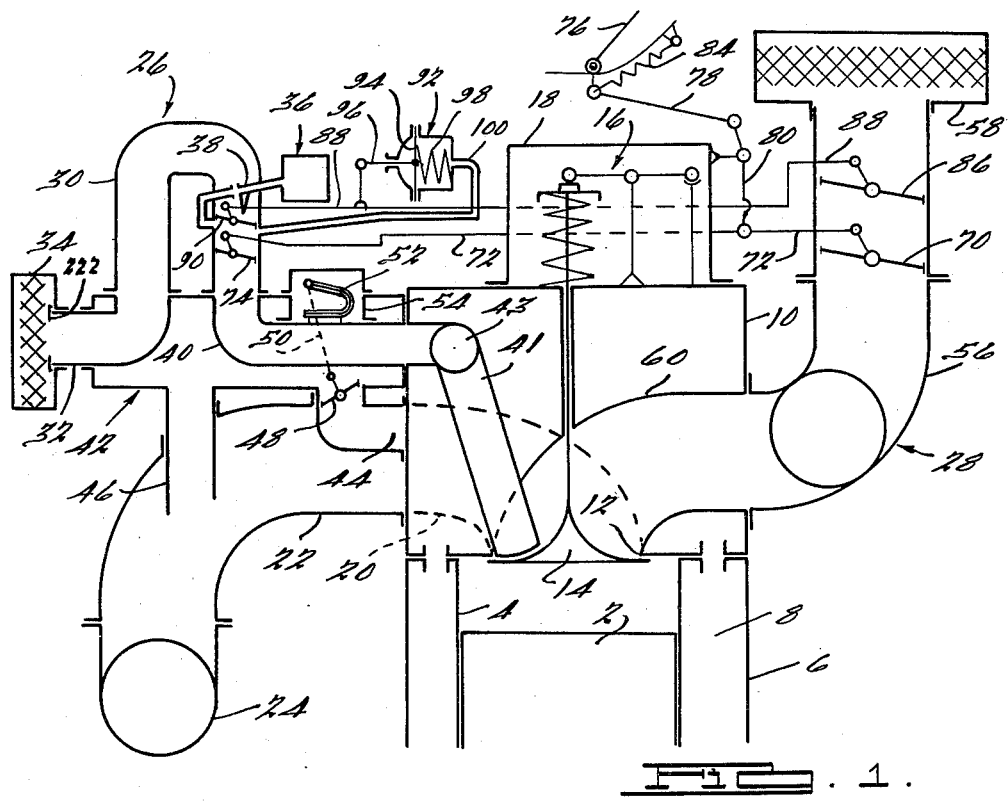
Fig. 1 is a diagrammatic view illustrating the invention applied to an internal combustion engine.
Figure 2:
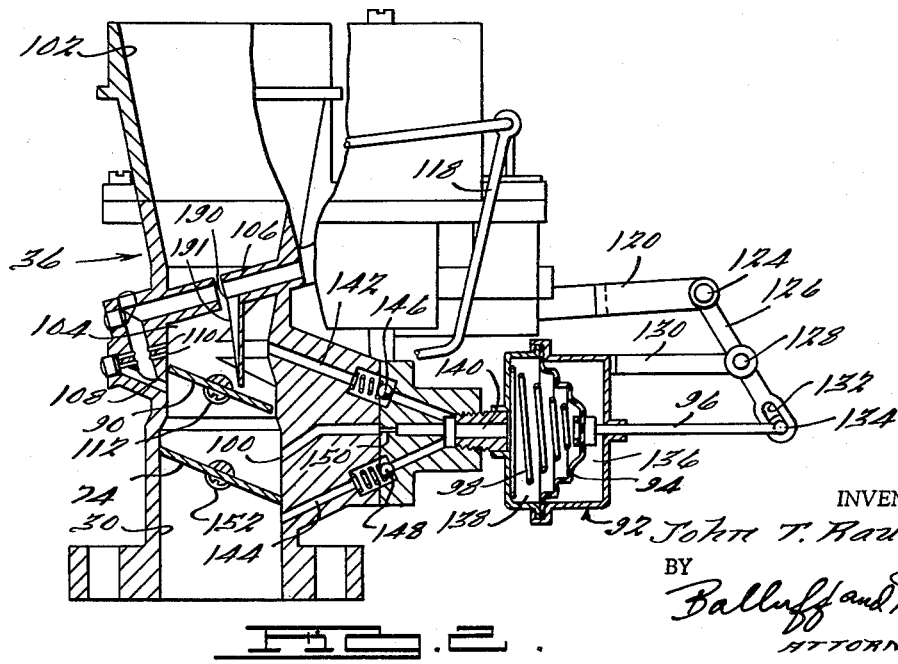
Fig. 2 is a sectional view of a carburetor suitable for use in the present invention.

Fig. 1 is a schematic illustration of one embodiment of the invention as applied to a conventional multi-cylinder, four-stroke cycle, valve-in-head internal combustion engine, only one of the cylinders being illustrated. A piston 2 reciprocates within a cylinder 4 surrounded by a jacket 6 containing the cooling medium 8. A cylinder head 10 is provided with an intake port 12 controlled by an intake valve 14 actuated in timed relation to engine operation by a valve operating mechanism 16 located within a casing 18 secured on the cylinder head 10. The exhaust port for the cylinder 4 is controlled by a suitable exhaust valve (not shown) also actuated by a suitable timing mechanism, and the exhaust port communicates with an exhaust passage 20 leading to an exhaust manifold 22 secured to the cylinder head 10 and discharging the exhaust gases into an exhaust pipe 24 common to all of the cylinders.

The induction system includes a "hot" portion 26 and a "cold" portion 28. The hot portion 26 of the induction system is adapted to supply a small part of the air and all of the fuel required by all of the engine cylinders, and the cold portion 28 is adapted to supply the remaining large quantity of air required by the engine.

The portion 26 of the induction system includes an air passageway 30 provided at its intake end 32 with an air cleaner 34, a carburetor indicated at 36 having a nozzle 38 extending into passage 30 for supplying fuel thereto in response to the flow of air through the passage 30, and a passage 40 for conducting the rich fuel-air mixture to an intake manifold 43. A passage 41 extends from manifold 43 to each cylinder 4 and terminates at the intake port 12 of such cylinder. This portion of the induction system further includes a heater 42 having an inlet 44 and an outlet 46 for discharging the exhaust gases into the exhaust manifold 22. The air passage 30 and the mixture passage 40 extend for a substantial portion of their lengths through the heater 42 so that the air in passage 30 and the fuel-air mixture in passage 40 will be heated by the exhaust gases circulating through the heater 42.

It is not believed that passage 40 will need to be unduly lengthened in order to provide substantially complete vaporization of the fuel, but it is contemplated that a by-pass passage might be provided and controlled by a thermostatically controlled valve to feed the fuel-air mixture directly to the engine cylinders when the engine is cold, or until the heater is operable to vaporize the fuel. While not illustrated herein, the use of such an expedient is within the scope of this invention.

The quantity of exhaust gases circulated through heater 42 is regulated by a valve 48 connected through a linkage 50 to a thermostat 52 mounted on the conduit 40 and enclosed within a casing 54 for shielding the thermostat 52 from the exhaust gases so that the thermostat is responsive to the heat of passage 40. The heater 42 is adapted to heat the incoming air prior to its entry into the carburetor 36 and to further heat the rich fuel-air mixture supplied by the carburetor to convert the fuel to a gaseous state in which it is maintained in passage 40 and in the passages 41 leading to the cylinder inlet ports 12. The thermostatically controlled valve 48 will regulate the circulation of exhaust gases through heater 42 to maintain the passages 30 and 40 at the required temperature.

The cold portion 28 of the induction system includes a large passage 56 having an air cleaner 58 at its inlet end and communicating with a passage 60 in cylinder head 10 terminating at the intake port 12. The cold portion of the induction system is adapted to supply substantially all of the air required for combustion to each of the cylinders of the engine and air is delivered through this portion of the induction system at substantially ambient temperatures.

A throttle valve 70 is operably disposed within the cold air intake passage 56 and is connected through a link 72 with a throttle valve 74 operably disposed within the passage 30 of the hot portion of the induction system. The throttle valves 70 and 74 are normally closed and are opened manually by depression of accelerator pedal 76 which is connected through links 78 and 80 and to the link 72 which interconnects the throttle valves 70 and 74. A return spring 84 connected to the accelerator pedal linkage is adapted to close the valves 70 and 74 when the accelerator pedal is released.

The induction system further includes a second throttle 86 operably disposed within the cold air passage 56 upstream from the throttle valve 70. Valve 86 is connected through a suitable linkage 88 with a throttle valve 90 operably disposed upstream from the valve 74 in the passage 30.

The throttle valves 86 and 90 are automatically controlled in response to the vacuum existing within the passage 30, such vacuum being regulated by the manually operable throttles 70 and 74. A vacuum actuated power cylinder 92 is provided with a flexible diaphragm 94 connected to link 88 through an actuating rod 96. A spring 98 within the cylinder 92 urges the diaphragm 94, its actuating rod 96 and the lever 88 in a direction to close the valves 86 and 90. A suction line 100 communicates the vacuum cylinder 92 with the main air passage of the carburetor 36.

The carburetor 36 illustrated schematically in Fig. 1 may be similar to that disclosed in Rauen Patent 2,687,710 issued August 31, 1954, with certain modifications thereof. Such carburetor is illustrated in Figs. 2 to 7 and comprises an air passageway 102 having a venturi portion 104 through which extends the main fuel passageway 106. The air passage 102 is connected to or forms a part of the intake passage 30 illustrated in Fig. 1 and the throttle valves designated 74 and 90 correspond to those described in connection with Fig. 1. A carburetor of this type, as disclosed in the aforementioned patent, employs only a single fuel supply system and all of the fuel required for all engine operation is supplied through the fuel passage 106 which extends across the venturi portion of the carburetor and terminates in openings 108 and 110 located on opposite sides of throttle 90 when the latter is in its closed position.

Referring to Figs. 2 to 7, the throttle valve 90 is secured on a throttle shaft 112, one end of which extends through and is journaled in a boss 113 projecting from the wall forming the main air passage of the carburetor, and a lever 114 is secured on the end of shaft 112 for movement therewith. The other end of throttle shaft 112 extends through a boss 115 projecting from the opposite wall of the carburetor air passage 30 and has secured thereto a lever 116 to which is connected a rod 118 for operating the accelerator pump of the carburetor as described hereinafter.

A link 120 has one end pivotally connected at 122 to the lever 114 and the opposite end of link 120 is pivotally connected at 124 to a lever 126 which is pivoted at 128 to a fixed support 130 secured to the vacuum cylinder 92. The link 120 corresponds to a part of linkage 88 illustrated in Fig. 1. The other end of lever 126 is provided with a slot 132 receiving a pin 134 secured on the outer end of the actuating rod 96 of the vacuum device 92. The diaphragm 94 which is clamped between the two halves of the casing forming the vacuum cylinder 92 separates the latter into a chamber 136, which is open to atmosphere through a suitable air bleed, and a vacuum chamber 138 containing the spring 98 and communicating through passage 140 with the pasages 142, 100 and 144. The passage 142 is provided with a check valve 146 which is spring loaded to remain seated to close passage 142 until the vacuum in passage 142 exceeds approximately one and one-half inches mercury. The passage 142 terminates within the venturi portion 104 of the main air passage 30 above the throttle valve 90. The passage 144 is provided with a similar check valve 148 which is spring loaded to remain seated to close the passage 144 until the vacuum within such passage exceeds approximately eighteen inches mercury. The passage 100 is provided with a restriction 150 but is open at all times to the vacuum chamber 138. The passage 100 terminates in the air passage 30 between the throttle valves 74 and 90 and the passage 144 terminates in the air passage 30 below the throttle valve 74 when the latter is in its closed position.

The throttle valve 74 is secured to a throttle shaft 152 which extends through and is journaled in a boss 153 projecting from the carburetor body and a lever 154 is secured on the end of throttle shaft 152. The lever 154 is pivotally connected at 156 to a link 158 having a slot 160 therein receiving a pin 162 projecting from lever 114. The opposite end of throttle shaft 152 is journaled in a boss 163 and has secured thereto a throttle lever 164 which is adapted to be connected at 166 to the link 72 which is actuated in a throttle opening direction by the accelerator pedal 76 and in a throttle closing direction by the return spring 84. The slot 160 and the levers 114 and 154 are preferably designed so that, when the engine is not running and the manual throttles are opened fully, the bottom of slot 160 will engage pin 162 to open the automatic valve 90 an amount sufficient to permit "airing out" of the induction system and engine cylinders. An arm 167 is pivotally connected by a pin 168 to the upper end of link 158. The arm 167 is provided with a notch 169 forming a detent within which the pin 162 is disposed. A leaf spring 171 secured to link 158 has its lower end engaging a projection 173 on arm 167 for urging the arm 167 against the pin 162. Arm 167 may engage link 158 to limit pivoting of arm 167 in a clockwise direction.

Referring to Figs. 3, 10 and 11, the carburetor is provided with a thermostat 170 having one end secured by a plate 172 which is seated against a hot spot on the heater 42 so that the thermostat 170 is responsive to engine temperatures. The other end 174 of the thermostat has pivotally connected thereto a roller 176 engaging a detent portion 178 of plate 172. The thermostat is shown in Figs. 3 and 10 in its cold position and in Fig. 11 in its hot position. A thermostat rod 180 extends into the thermostat housing 182 and engages the thermostat 170 so as to be elevated or lowered in accordance with engine temperatures. The thermostat rod 180 is connected to the fuel metering pin of the carburetor in a manner to be described and has secured thereto an arm 184 (Fig. 3) having a finger 186 engaging a cam surface 188 formed on the throttle lever 164 whereby the fuel metering system is controlled in part by the manually controlled throttle and in part by the thermostat 170 which is responsive to engine temperatures. As the thermostat heats up in response to increased engine temperatures, the thermostat rod will be elevated to lean out the fuel mixture supplied by the metering system. The thermostat is adapted to maintain the thermostat rod 180 in its elevated or lean-mixture position until the engine has cooled substantially in the event that the engine is stopped while hot, thus preventing too rich a starting mixture if an attempt is made to restart the engine while it is still hot. The detent 178 is provided with a slope over which the roller 176 must rise before the thermostat can contract as it cools down. Thus the engine and the thermostat must cool a substantial amount before any contraction of the thermostat and lowering of the thermostat rod 180 can take place. When the thermostat has cooled a sufficient amount, the contracting force thereof will overcome the resistance offered by the detent 178 and the thermostat and thermostat rod will again assume the cold position illustrated in Fig. 10 in which a richer starting mixture will be provided.

The metering system of the carburetor is illustrated in Fig. 6 and, since such metering system may be essentially the same as that disclosed in Rauen Patent 2,687,710, a brief description thereof will be sufficient for the purpose of this invention. As shown in Fig. 6, the fuel passage 106 slopes continuously downwardly from a chamber 200 in which is located a stand pipe 202 which projects above the level of fuel in the float bowl of the carburetor. The float bowl, although not disclosed in Fig. 6, communicates with valve chamber 204 so that the latter is supplied with fuel at all times. The upper end of chamber 200 is formed by a hollow tubular member 206 into which the open upper end of the stand pipe 202 projects. A metering pin 208 extends through pipe 202 and tubular member 206 and has a valve member 210 formed thereon and disposed within valve chamber 204. The lower end of the metering pin 208 is received within a guide aperture 212. The upper end of the metering pin 208 has a tapered valve portion 214 terminating in a collar 216 adapted to close the upper end of the tapered air passage 218 in the tubular member 206. The tapered valve portion 214 and the oppositely tapered passage 218 in the tubular member 206 form an air metering valve through which air flows into the chamber 200 of the fuel metering system. The valve member 210 formed on the metering pin meters the flow of liquid fuel from the float bowl into the stand pipe 202. The fuel which is drawn upwardly through pipe 202 will be wiped off of the upper end of the pipe and drawn downwardly into chamber 200 by the air which flows through the tubular member 206 the quantity of such air being metered by the valve portion 214 of metering pin 208.

The metering pin 208 above the air metering valve portion 214 and 216 is provided with a collar 220, the underside of which is engaged by a pivoted arm 222 carrying an adjustable screw 224 which engages the upper end 226 of the thermostat rod 180. It will be seen from Fig. 6 that elevation of the thermostat rod 180 as the engine warms up will, through arm 222 and collar 220, elevate the metering pin 208 to partially close and thereby reduce the fuel flow past valve 210, and at the same time reduce the vacuum at the opening into the standpipe 202 by enlarging the opening through passage 218 to bleed more air into the metering system, thereby providing a lean fuel mixture.

In the embodiment of the invention illustrated in Fig. 1, when the engine is at idling speed, that is, under no more load than its own friction, a vacuum of approximately eighteen inches mercury exists in the induction system below the throttle valves 74 and 70. The manual throttle valve 74 is open to its normal hot idle position, hereinafter referred to as its closed position, and the automatic throttle valve 90 is in its closed position, which is, however, open slightly more than throttle 74 to maintain a vacuum of approximately one inch mercury between the valves 74 and 90. The force of the spring 98 which urges the diaphragm 94 in a throttle closing direction will be substantially balanced by the slight amount of vacuum transmitted to the diaphragm 94 through the restriction 150 in the passage 100. The one inch vacuum which exists between the valves 74 and 90 is transmitted through passage 108 to the main fuel nozzle 106 to draw fuel from the metering system through the passage 106 and the outlet 190 therein onto the nozzle extension 191 to supply fuel for idling engine operation. The vacuum in the venturi 104 above valve 90 will at this time be practically non-existent so that check valve 146 will remain closed.

The automatic valve 90 is provided with a stop for determining its closed position, and as illustrated in Figs. 4 and 5, the automatic throttle stop comprises a screw 230 threaded into a projection 232 formed on boss 113 and engaged by a finger 234 on throttle lever 114. The screw 230 may be adjusted to provide an open position of valve 90 which will maintain a one-inch vacuum between valves 74 and 90. Since slight variations in the induction system vacuum may take place during idling engine operation, the spring pressed detent arm 167 is provided for holding lever 114 against its stop screw 230 to prevent such pressure variations from opening the automatic throttle valve 90 in the event the vacuum at passage 109 should exceed one inch by some slight amount. This feature of the invention also makes it unnecessary to obtain an exact calibration of spring 98 or an exact balance between the force of spring 98 and the desired one-inch vacuum.

As the manual throttle valves 70 and 74 are opened, the vacuum below valve 74 will be transmitted to the vacuum chamber 138 through passage 100 to overcome the force of spring 98 and move the diaphragm 94 in a throttle opening direction. The automatic throttle valves 90 and 86 will be opened by the vacuum device 92 as the manual throttles are opened, thereby tending to restore the one-inch vacuum below the valve 90. The spring 98 is of the type that has a very low rate of force increase upon increased compression thereof, or, in other words, the spring is constructed so that even when fully compressed it exerts only a slightly greater force than when only partially compressed. Therefore, when the manual valves 74 and 70 reach a partially open position, which may be in the order of one-quarter open, the vacuum responsive valves 90 and 86 will have opened a proportionate amount and the velocity of the air flowing through the venturi 104 will at such time be sufficient to draw the required additional fuel from opening 190 in fuel nozzle 106, and will also be sufficient to unseat the check valve 146 to transmit the vacuum in the venturi to the diaphragm 94, whereupon diaphragm 94 is controlled by the vacuum in venturi 104 resulting from the flow of air therethrough, until at a further predetermined degree of manual throttle opening the valves 86 and 90 will open fully and the manual throttle valves 70 and 74 will then provide the sole throttling function in the system. The pin 162 on lever 114 will move past detent 169 by pivoting arm 167 against the spring 171 when the vacuum device 92 opens valves 90 and 86 with the manual valves 74 and 70 less than full open.

If the engine is operating under high speed, full open throttle conditions and the manual throttles are suddenly closed, the automatic throttle valves will initially tend to close therewith, until the vacuum downstream of the throttle valve 74 exceeds eighteen inches mercury due to closing of valve 74, whereupon check valve 148 will open the passage 144 to transmit such vacuum to the diaphragm 94 to reopen valves 86 and 90 and then maintain them in their full open positions. At this time the velocity past the main fuel nozzle 106 and the vacuum between the valves 74 and 90 will be so low that no fuel will be drawn thereby through the fuel passage 106. The length of slot 160 in link 158 is such as to permit the manually controlled valve 74 to close while vacuum responsive valve 90 is fully opened. The automatic valves 86 and 90 will remain open until the engine speed drops to a point at which the vacuum below the valve 74 falls below eighteen inches mercury to allow check valve 148 to close and allow the spring 98 to actuate the diaphragm 94 to again close the valves 86 and 90 and re-establish the one-inch vacuum between the valves 74 and 90. It will be apparent that the passages 108 and 110 through which vacuum is transmitted to the fuel outlet 190, and outlet 190, must be calibrated so as to enable fuel to be drawn through the fuel passages under the one-inch vacuum referred to.

An important feature of the present invention is the fact that the automatically controlled valves 86 and 90 are subjected to a very low vacuum of the order of one inch mercury and therefore are subject to very little frictional resistance to opening or closing movements thereof. The frictional resistance to turning imposed by the one inch vacuum is so slight as to be substantially negligible when compared with the force that can be exerted by the diaphragm 94 or the spring 98, thereby insuring very smooth and accurate adjustments of the valves 86 and 90. It will be apparent that, if the automatic throttles were subjected to the high vacuum to which the manual throttles are normally subjected, the resulting frictional resistance to turning would result in abrupt or irregular opening or closing movements of the automatic throttles and consequent rough or irregular engine operation.

As the manual throttle valves 74 and 70 are opened, the vacuum responsive valves 90 and 86 tend to open therewith in response to increased vacuum transmitted to the diaphragm 94 through the passage 100, as long as the induction system vacuum is above one inch mercury. However, if upon opening of the manual valves at low engine speed operation, the induction system vacuum falls below one inch, the valves 90 and 86 will no longer follow continued opening movement of the manual valves but will take up an intermediate open position at which the engine can take in a substantially full charge or, in other words, a sufficient quantity of fuel and air to fully satisfy engine requirements for full torque output under such operating conditions. Therefore, while the vacuum responsive valves 90 and 86 will open sufficiently to supply the engine with all of the fuel-air mixture and cold air that it can efficiently use under low engine speed and full open manual throttle operating conditions, the automatic throttles will maintain sufficient vacuum in the induction system to assure adequate fuel flow under such conditions.

Although not disclosed herein, it is contemplated that the automatically operable valves 74 and 90 might be of the unbalanced type and actuated toward their closed positions by a weighted arm attached to one of the valves, thereby eliminating the vacuum actuated device 92 but retaining the advantages of the use of separate air and fuel-air mixture passages.

The throttling action imposed by the automatic throttles 90 and 86 occurring when the manual throttles are fully opened under low engine speed operation is supplemented by an adjustment of the metering system of the carburetor to supply a rich or full power mixture to the engine under such conditions. Assuming that the engine is fully warmed up, so that thermostat rod 180 and the finger 186 carried thereby are elevated to provide an economy mixture for normal engine operation, a full opening of the manual throttle will bring the cam portion 238 of the throttle lever 164 over the finger 186 to drop the thermostat rod 180 and allow metering pin 208 to be lowered and decrease the amount of air admitted by valve 214, 218 and simultaneously admitting more fuel past valve 210, thereby drawing more fuel from the standpipe 202 to give a richer mixture under such operating conditions. This richer or full power mixture will, of course, be obtained when the automatic valves 86 and 90 are open, whenever the manual throttles are fully opened.

Referring to Figs. 1 and 8, the mixture passage 41 which extends through the cylinder head 10 terminates closely adjacent the head of the intake valve 14 when the latter is in its closed position so that the passage 41 is practically sealed by the intake valve. This construction enables cooling of the hot mixture by the cold air from passage 60 and consequent shrinkage in its volume, which provides a maximum filling of the cylinder with the correct amounts of fuel and air and does not adversely affect the equal distribution of fuel to the cylinders, since equal distribution is already accomplished at that point in the induction system. Such location of the end of passage 41 prevents the possibility of the hot mixture in the passage 41 flowing past the intake valve 14 into the passage 60 where the gaseous fuel would condense and under certain conditions might flow back through the cold intake manifold to enter other cylinders of the engine, thereby upsetting the desired equal distribution of fuel to all of the cylinders. Another feature of this construction is to assure that the vacuum created by the intake stroke of the piston at the intake port 12 is established equally at the ends of both passages 41 and 60. Since both passages terminate at the intake port 12, they will be subjected to the same vacuum and there will be no tendency for the cylinder vacuum to be satisfied from one passage to the partial or total exclusion of the other. The inlet ends of passages 30 and 56 should be disposed in equal pressure areas and may have a common air cleaner, or a valve 222 may be disposed in one of the passages to calibrate the same relative to the quantity of air supplied through the other passage.

It is recognized that the manner in which the fuel-air mixture delivered through passage 41 is caused to flow into the cylinder will affect the ignition and combustion characteristics of the final mixture. The techniques for varying the manner in which the passage 41 delivers the fuel charge into the cylinder so as to produce desired ignition and combustion characteristics, particularly in the region of the spark plug, are well understood in the art and the adaptation of such well-known techniques to the induction system of this invention will be apparent to those skilled in the art.

At extremely low engine speeds with the manually controlled throttle valves 70 and 74 partially open, and at other low engine speeds with the valves 70 and 74 fully open, the piston intake strokes will occur at a rate low enough to cause variations in the speed of the air flowing through the induction system, and therefore variations in the pressure below the automatic valve 90 in consequence of valves 86 and 90 tending to restrict air entry, and consequent slight variations in the vacuum existing in the vicinity of the passage 100. This condition will result in slight variations of the vacuum transmitted to the vacuum chamber 138 of the vacuum device 92, which in turn will effect alternate slight opening and closing movements of valves 90 and 86, or what may be referred to as fluttering of the vacuum responsive valves and the accelerating pump piston 240, the latter being illustrated in Figs. 6 and 9 and is connected to such valves through the lever 118 and the piston rod 242.

The accelerator pump is of novel construction and comprises a cylinder 244 having an inlet 246 communicating with the carburetor float bowl through passages 248 and 250 and normally closed by a check valve 252 which is retained within the enlarged portion 254 of passage 246 by a valve retainer or spider 256. The valve 252 is adapted to open passage 246 when the piston 240 is moved upwardly within the cylinder 244. The cylinder 244 has a discharge outlet 260 provided with a check valve 261 and leading to the chamber 200 and fuel passage 106 whereby fuel from the float bowl of the carburetor, which is drawn into the cylinder 244 through inlet 246 when the accelerator pump piston 240 is retracted by spring 98 of vacuum device 92, will be trapped within cylinder 244 by valve 252 so as to be ejected through the outlet 260 past valve 261 into the main fuel passage 106 when piston 240 moves downwardly through cylinder 244. The fluttering action of the valve 90 will therefore result in small quantities of fuel being pumped into the passage 106 by the accelerator pump at low engine speed, open throttle operating conditions to prevent stalling of the engine. When the valves 86 and 90 are suddenly opened due to opening of check valve 148 while decelerating with the manual throttles closed, as previously described, it may be desirable to prevent the accelerating pump from delivering fuel to the engine. While not illustrated herein, a vacuum responsive by-pass valve may be opened for by-passing fuel from the pump back to the fuel reservoir whenever the vacuum between valves 74 and 90 falls appreciably below the minimum one inch vacuum. The vacuum line to actuate such valve would open into passage 30 between valves 74 and 90.

The induction system is thus capable of achieving optimum engine operation at all engine speed and load conditions and throttle settings that might be encountered. The provision of separate passages for the fuel mixture and cold air, with provisions for heating the fuel to a gaseous state, assures equal distribution of the charge to the engine cylinders and also permits the use of a cold air passage of a capacity large enough to supply the maximum volume of air to the cylinders for normal and full power operation. These advantages are obtained even though only a single fuel source is employed. Low engine speed operating requirements are met by the provision of the vacuum responsive throttles 86 and 90 which automatically maintain engine vacuum at such value as to assure a rate of fuel supply which will provide smooth idling of the engine, and the above described fluttering action of the vacuum device 92 enables the engine to operate at an extremely low speed under high load conditions even with the manually controlled throttles wide open.

The accelerator pump piston 240 illustrated in Fig. 9 represents an improvement over pistons of this type heretofore used in carburetor devices, in that very little friction is developed by movement of the piston through the cylinder 244 and, further, in that it is not necessary that the piston 240 and its piston rod 242 be in exact axial alignment with the cylinder 244. The piston 240 comprises three washers 262 each having an annular recess 264 on its lower face, and a washer 266, all of which washers are clamped against a shoulder 268 formed on the lower end of the piston rod 242. The washers 262 and 266 are of substantially smaller diameter than cylinder 244. The piston further includes three rings 270 having an outside diameter closely fitting the pump cylinder 244. The rings 270 have a thickness equal to about one-half of the axial length of the recesses 264 and have an inside diameter providing a substantial radial clearance between the rings 270 and the washers 262.

By reason of the above construction of the washers 262, 266 and rings 270, and the clearances therebetween, the entire piston assembly can be considerably misaligned within the cylinder 244 without creating excessive friction, and without decreasing the pump intake and discharge pressure. In fact, pump pressures attainable with this piston construction will be higher than with a one-piece piston of the same length, because the very short axial length of the rings 270 enables them to have a closer fit within the cylinder 244 than would be possible with a solid piston of equal length. The rings 270 are free to tilt relative to the washers 262 and 266 to enable such freedom of movement of the piston and for the further purpose of permitting small particles of dirt or other material suspended in the fuel to readily pass one of the thin rings 270. Such foreign particles may pass into one of the recesses 264 and remain there or may pass between the rings 270 and the cylinder wall successively by slightly tilting or deflecting each ring to increase its cylinder wall clearance as the particle moves past such ring.

Fig. 12 discloses an induction system of the type forming the subject matter of this invention in which any suitable fuel supply device is employed for supplying fuel to the heated portion of the induction system and in which the throttling system and the throttle controlling devices are somewhat different that in the Fig. 1 modification. In Fig. 12 the hot portion of the induction system is indicated at 300 and the cold air intake portion is indicated at 302. The heated portion 300 of the induction system includes an intake air passage 304 which passes through a part of the exhaust gas heater in the manner described in connection with Fig. 1. The passage 304 leads to a mixture passage 306 in which fuel is supplied to the small quantity of heated air flowing through passage 304 by a carburetor 308 which may have a fuel supply system similar to that disclosed in Rauen Patent 2,453,728. The fuel-air mixture discharged from the lower end of mixture passage 306 is then further heated to convert the fuel to a gaseous state and is then distributed to the cylinders of the engine in the manner disclosed in Fig. 1.

In this modification of the invention an intake air operated valve 310 of the unbalanced type is pivoted at 312 along with a link 314 connected thereto and having a pivotal connection 316 with a link 318. A spring 320 has one end connected to the pivot 316 and its other end connected to a fixed support 322. The air valve 310 is biased toward its closed position by the spring 320. The other end of link 318 is pivotally connected at 324 to a link 326 which is pivoted at 328 to a throttle lever 330 to which the throttle valve 332 is secured. The throttle lever 330 has a second arm 334 pivotally connected to a link 336 which is pivoted at 338 to the throttle lever 340 to which the valve 342 is connected.

A manual throttle operating link 344 is actuated in a throttle opening direction by the conventional accelerator pedal and in a throttle closing direction by a return spring 346. Throttle valve 348 has a throttle lever 350 which is pivotally connected to link 344 and to a rod 352 pivoted at 354 to a second throttle lever 356 to which the throttle valve 358 is secured. Link 344 is also connected to a lever 360 for operating the throttle valve 362. The throttle lever 356 has an arm 364 engageable with one end 366 of a lever 368 which is pivotally connected at 370 to the fixed support 322 and has its other end connected to the pivot 324.

The carburetor 308 is adapted to supply all of the fuel required by the engine under all operating conditions through a fuel nozzle 372 which discharges fuel into the mixture passage 306 between the manually operated throttle valves 348 and 358. The air valve 310 and throttle valve 332 in the mixture passage 306, and the throttle valve 342 in the cold air passage which is connected thereto through link 336, are vacuum responsive valves. When the manual throttle valves 348 and 358 and the manual valve 362 connected thereto are opened by the accelerator pedal beyond a predetermined degree of opening, which may be in the order of one-quarter open, the valve 310 will open at a faster rate toward its full open position, and at another predetermined degree of opening of manual throttle valves 348, 358 and 362, but before full opening of the latter, valves 310, 332 and 342 will reach their full open positions. The throttling function will thereafter be provided by the manually controlled throttles 348, 358 and 362. The valves 332 and 342 may be located upstream of valves 348 and 362, as long as valve 332 is downstream from nozzle 372.

The manually operated throttle valve 358 is opened slightly further than the valve 348 and the automatically operated valve 332 is opened a slight amount beyond air valve 310, while valve 342 and air valve 310 are open to an equal extent. When the manual throttle valves are moved toward their fully closed positions beyond the approximately one-quarter open position referred to the arm 364 on throttle lever 356 engages the end 366 of the lever 368 to pivot such lever and thereby restrain the air valve 310 and the valves 332 and 342 which are operable therewith from further closing movement, whereupon the throttling or vacuum regulating function of the valve 310 is taken over by the manually controlled valve 358. The manually controlled valves 348 and 358 are adapted to maintain a vacuum of the order of one inch mercury at the fuel nozzle 372 during low engine speed operation with the manual throttles in their idling and off-idling positions, providing a more accurately controlled fuel supply than could be obtained if the valve 310 were allowed to perform the vacuum regulating function under such operating conditions. It will be noted that valve 332 is in a slightly more open position than valve 310 so that valve 310 always tends to open to admit a larger quantity of air whenever a demand therefor is created by opening of manually operated valves 348 and 358. In the event that valve 310, because of excessive friction, fails to open in response to opening of the manually controlled throttles, the valve 332 will prevent the vacuum below throttle 332 from creating at the nozzle 372 a vacuum greatly in excess of the one inch vacuum referred to, thereby preventing excessive fuel flow and consequent stalling of the engine. Thus through the provision of valve 332 the engine can continue to be operated at least through a limited range even though the air valve 310 should fail to open. When the manually controlled valves 348 and 358 are opened beyond the referred to one-quarter open position at extremely low engine speed, the valve 310 is moved by spring 320 toward its closed position for throttling the incoming air at entry 304 sufficiently to maintain the referred to one-inch vacuum at nozzle 372, thereby assuring the flow of fuel in the amount required for maximum engine power corresponding to such engine speed and throttle opening.

Fig. 13 illustrates a further modification of the throttle valves in the induction system, only the heated portion 400 of which is illustrated in Fig. 13. In this modification the mixture passage 402 is provided with a manually operated throttle valve 404 and a vacuum responsive valve 406 upstream of the manual valve 404. The carburetor 408 has a fuel nozzle 410 terminating in the mixture passage 402 between the throttle valves 404 and 406. The manual throttle lever 412 is connected by a link 414 to the accelerator pedal and a return spring 416 connected to the accelerator pedal link 414 is adapted to close the valve 404. A vacuum responsive device 418 similar to that disclosed in the principal modification of the invention includes an actuating rod 420 which is connected at 422 to a link 424 pivotally connected to the throttle lever 426 of the automatically operated valve 406. The diaphragm 428 of the vacuum device 418 is urged in a throttle closing direction by the spring 430 and a vacuum line 432 communicates the vacuum device with the mixture passage 402 in the region of the fuel nozzle 410. It is to be understood that the modification illustrated in Fig. 13 would include a second or unheated portion of the induction system through which the larger quantity of unheated air would be supplied to the engine cylinders as described in connection with previous modifications, and that such cold air portion of the induction system would include a manually operable throttle connected to the link 414 and a vacuum responsive throttle upstream thereof and connected to the actuating linkage for the valve 406.

The vacuum responsive valve 406 is adapted to be positioned open slightly beyond the manual valve 404 so as to maintain a one inch vacuum between the throttle valves 404 and 406 to draw fuel from the metering system of the carburetor 408 through the nozzle 410. As the manual throttles are opened, the action of the vacuum responsive throttles will depend upon the load on the engine. When the engine load is light, the engine speed will increase in pace with the speed of opening of the manual throttles and, when the engine load is heavy, the engine speed will not increase in pace with throttle movement. When the engine is operating under heavy load conditions and the manual throttles are opened, the vacuum responsive throttles will open therewith but at a progressively slower rate to maintain such one-inch vacuum in the mixture passage until a predetermined degree of manual throttle opening is reached, whereupon the automatically operated throttle valve 406 ceases its opening movement even though opening movement of the manual valve 404 is continued, and thereafter any increase in air flow through the mixture passage will create sufficient vacuum in the vicinity of vacuum line 432 to actuate diaphragm 438 against spring 430 to fully open the automatically operated valve 406 and the valve corresponding thereto in the cold portion of the induction system. The air velocity through the mixture passage will at such time be sufficient to draw from the fuel nozzle all of the fuel required for engine operation. When the engine is operating under light load conditions the automatically operated throttle valves will move from closed to full open position, and vice versa, in synchronism with the manually operated throttle valves so that the volume of air flowing through the air passage and the vacuum in the vicinity of the fuel nozzle responsive to the velocity of the air flow will be increased or decreased in accordance with the position of the throttle valves to supply the required amounts of fuel and air to the engine.

A passage 434 is connected into the vacuum line 432 and terminates in the passage 402 below the throttle valve 404. A check valve 436 in passage 434 is designed to open only when the vacuum below the throttle valve 404 is at or above about eighteen inches mercury. When the manual throttles are closed with the engine operating at high speed, the vacuum below valve 404 will immediately exceed eighteen inches mercury to open check valve 436 and transmit such vacuum to the vacuum device 418, whereby the valve 406 will be held in its open position to reduce the vacuum at nozzle 410 to a point at which fuel will not flow therefrom. A restriction 438 in passage 432 will prevent the vacuum in passage 434 from being satisfied through the outlet of passage 432 in the mixture passage. By means of such construction the fuel supply will be cut off when the engine is operating at high speeds with the manual throttles closed, thereby providing greater fuel economy and other advantages referred to in connection with the Fig. 1 modification of the invention. When the engine speed drops sufficiently so that the vacuum below the valve 404 does not exceed eighteen inches mercury, the check valve 436 will close and the spring 430 will thereupon close the automatically operated throttle valves to again establish the one inch vacuum between the manual and automatic throttle valves.

Fig. 14 illustrates a modified form of the fuel supplying portion of the induction system and is generally similar to the modification disclosed in Fig. 12, except that in this modification a balanced valve 500 is located at the inlet end of the mixture passage and is controlled by a vacuum actuated device 502 through a link 504 connected at one end to the actuating rod 506 and at its other end to the throttle lever 508 secured on the throttle shaft of the valve 500. The other end 510 of the throttle lever 508 is pivotally connected to a rod 512 which is connected to the throttle lever 514 of the valve 516. The carburetor 518 includes a fuel nozzle 520 terminating in the mixture passage 522 between a pair of manually controlled throttle valves 524 and 526 operated by the accelerator pedal linkage 528 and the return spring 530. A vacuum line 532 opens into the mixture passage 522 between the manual throttle valves 524 and 526 and transmits the vacuum therein to the diaphragm 534 of the vacuum device 502.

The spring 536 of the vacuum device 502 normally maintains the vacuum responsive valves 500 and 516 closed and the force of the spring 536 is such that a vacuum of about 0.6 inch mercury is required to initiate movement of diaphragm 534. An additional 0.4 inch of vacuum are required to fully open the valves 500 and 516. The valve 516 is open to a slightly greater extent than the valve 500 and similarly the manual valve 524 is advanced in an opening direction slightly beyond the position of valve 526 in order to maintain between the valves 524 and 526 a vacuum of the order of one inch mercury during engine idling. Such amount of vacuum will fully open the automatically controlled valves 500 and 516 under such engine operating conditions. The vacuum responsive valves will be held open by the vacuum device 502 upon opening of the manual throttle valves from their idling positions under low load conditions, and at and beyond a predetermined degree of opening of the manual throttles the vacuum in the vicinity of passage 532 will be sufficient to hold the automatic valves 500 and 516 full open, at which time the manual throttles alone will regulate the air flow through the mixture passage 522. Upon closing of the manual throttles at high engine speeds, the vacuum in the passage 532 drops to a point where the vacuum device 502 begins to close the automatic valves 500 and 516. If the manual valves are suddenly opened from their closed positions at low engine speed, high load conditions, the air velocity and consequently the vacuum in passage 532 will be insufficient to actuate the vacuum device 502 and the valves 500 and 516 will thereupon move toward their closed positions, stopping at a slightly open position to restore sufficient vacuum to enable fuel to be drawn from the nozzle 520. The automatically controlled valves 500 and 516 are fully open under all operating conditions whenever the engine speed is commensurate with the manual throttle opening, that is, when the engine speed increases or decreases in direct relation to an increase or decrease in the manual throttle opening. The manual valves 524 and 526 perform the sole throttling function at such times. However, when the load on the engine is such that the engine speed does not increase or decrease in direct relation to an increase or decrease in the manual throttle opening, such as accelerating from low or idling speeds with the manual throttles 524 and 526 full open, the valves 500 and 516 will first close to some extent and then begin to reopen as the engine speed increases until the air velocity in the region of passage 532 and nozzle 520 creates a one inch vacuum, whereupon the valves 500 and 516 will be fully opened and will stay open as the engine speed increases thereafter.

It is to be understood that in the modification of Fig. 14 a separate cold air intake passage would be provided with a manually controlled throttle valve operated by the control linkage for the valves 524 and 526, and a vacuum responsive valve upstream of the manual valve and connected to the control linkage for the valves 500 and 516. As described in connection with Fig. 12, the valve 516 could be located upstream of valve 526, but downstream of nozzle 520.

Fig. 15 illustrates a further modification of the invention in which only the heated portion 600 of the induction system is illustrated. This modification is similar to that disclosed in Figs. 1 to 7 and would include a separate cold air passage having a manually controlled valve and a vacuum responsive valve therein as in other modifications. The mixture passage 602 has a manually controlled valve 604 and a vacuum responsive throttle valve 606, both of which are controlled in the manner described in connection with Figs. 1 to 7. The metering system 608 has in this case been modified to provide a rich or full power mixture whenever the vacuum below the manually controlled valve 604 drops below approximately five inches mercury. To this end the standpipe 610, which corresponds to the standpipe 202 illustrated in Fig. 6, is provided with a fuel passage 612 opening into the pipe above the fuel metering valve 614 formed on the metering pin 616. The passage 612 has an inlet 618 controlled by a valve 620 formed on the end of a rod 622 provided with a piston 624 working within a cylinder 626 and urged by spring 628 in a direction to open the valve 620. The passage 612 receives fuel from the float bowl 630 when the valve 620 is open so as to supply fuel to the standpipe 610 in addition to that normally supplied through passage 632 past the fuel metering valve 614.

A suction line 634 terminates in the air passage 602 below the manually controlled valve 604 and is adapted to transmit the induction system vacuum below the throttle 604 to the cylinder 626 to retract the piston 624 against spring 628 to hold the valve 620 closed. However, when the manifold vacuum drops to below five inches mercury such as upon rapid opening of the manually controlled throttle valve 604 at low engine speeds, the spring 628 will overcome such reduced amount of manifold vacuum to open valve 620 and permit additional fuel to be supplied through standpipe 610 into the fuel passage 636 to insure an adequate amount of fuel and a mixture sufficiently rich to prevent engine knocking. This modification of the invention would otherwise be similar to that disclosed in Figs. 1 to 7.

Figure 16:
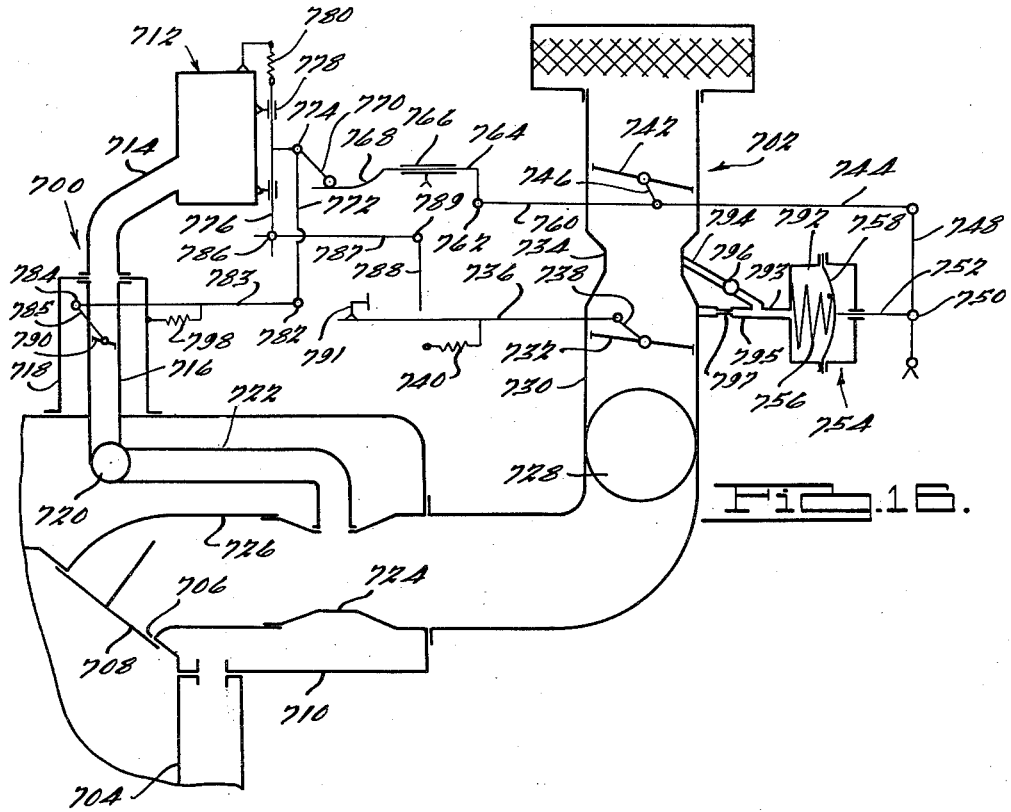
Fig. 16 is a diagrammatic view of a modified form of the invention.

Fig. 16 discloses a modified form of induction system which includes a heated portion 700 and a cold portion 702, the former supplying all of the fuel required for all engine operation and the latter supplying unheated air for mixture with the gaseous fuel in advance of the intake valve in the cylinder. The cylinder 704 is provided with an intake port 706 controlled by an intake valve 708 reciprocating in the cylinder head 710. The hot portion 700 of the induction system comprises a carburetor 712 having a fuel nozzle 714 connected to a fuel passage 716 which extends through an exhaust gas heater 718 similar to that disclosed in Fig. 1. The fuel passage 716 opens into a manifold 720 from which the gaseous fuel is distributed to the individual cylinders of the engine through a passage 722 which terminates in the throat of a venturi 724 formed in the cold air passage 726 leading from the cold air manifold 728 to each of the cylinders.

The cold portion 702 of the induction system includes a large diameter air passage 730 provided with a suitable air cleaner and opening into the manifold 728 at its lower end. A manually operable throttle valve 732 is disposed in air passage 730 downstream from the venturi 734 formed in such passage. The valve 732 is actuated by an accelerator pedal link 736 connected to the throttle lever 738 and a return spring 740 urges the throttle valve 732 to its closed position.

A vacuum responsive throttle valve 742 is located in air passage 730 above the venturi 734 and a link 744 has one end connected to the throttle lever 746 and its other end pivotally connected to an arm 748 which is pivoted at 750 to the actuating rod 752 of a vacuum actuated device 754 having a spring 756 urging the diaphragm 758 in a throttle closing direction.

A lever 760 is pivotally connected at one end to the link 744 and has its other end pivoted at 762 to one end of a cam member 764 which is slidable within a fixed guide 766. The other end of member 764 is provided with a cam surface 768 engaged by one end 770 of a lever 772 which is pivoted at 774 to a rod 776 slidably supported within a fixed guide 778 and urged in one direction by a spring 780. Lever 772 is pivoted at 782 to a link 783 pivotally connected at 784 to a throttle lever 785 for operating a throttle valve 790 disposed within fuel passage 716.

The lower end of rod 776 has a connection 786 with one arm 787 of a lever 788 having a fixed pivot 789. An arm 791 on the accelerator link 736 is adapted to engage lever 788 to pivot the same in a counterclockwise direction upon actuation of the link 736 in a throttle opening direction for a purpose to be described hereinafter.

A passage 793 opening into the vacuum chamber 792 of the vacuum device 754 communicates with the passages 794 and 795 which open into air passage 730. The passage 794 opens into passage 730 at the venturi 734 and a spring-loaded check valve 796 normally closes passage 794. The check valve 796 is designed to open passage 794 when the vacuum in the region of the venturi 734 exceeds approximately one and one-half inches mercury. The passage 795 opens into air passage 730 just above the manual throttle valve 732 and is provided with a restriction 797 for providing a constant although restricted communication between air passage 730 and vacuum chamber 792.

The fuel control valve 790 is urged to its closed position by a spring 798 connected to link 783 and the valve 742 is urged toward its closed position by the spring 756 of the vacuum device 754. When the engine is idling the vacuum in the induction passage 726 will be transmitted through passage 722 to draw fuel from carburetor 712 through the fuel passage 716. The normal idling position of the valve 790 and the valves 742 and 732 will permit sufficient quantities of fuel and air to be drawn through their respective passages 716 and 730 for idling engine operation. As the manual throttle valve 732 is gradually opened from its closed position, the vacuum responsive valve 742 will tend to open therewith in the manner described in connection with Fig. 1 so as to tend to maintain a vacuum of about one inch mercury between throttle valves 732 and 742 in the air passage 730. As vacuum responsive valve 742 opens, the cam member 764 slides in its guide 766 and the cam surface 768 reacts against the arm 770 to pivot lever 772 in a counterclockwise direction and thus open the fuel control valve 790. As the manual throttle valve 732 opens to allow more air to flow through passage 730, the induction system vacuum will be correspondingly lowered with the result that less induction system vacuum will be available in the fuel passage 722 to draw fuel from the carburetor 712, although more fuel is required by the engine at such time. Therefore, it is necessary that the valve 790 be opened at a slower rate than valve 742 during initial opening movement of valve 742, and then at a faster rate than valve 742 as the latter approaches its full open position at which time the velocity of the air flowing through venturi 724 creates sufficient vacuum in the fuel passage to draw the required amount of fuel through such passage. The cam surface 768 on cam member 764 is designed to effect the above-mentioned valve action. The increased air flow through passage 730 will by means of venturi 724 tend to increase the vacuum in fuel passage 722 but not an amount sufficient to compensate for the decrease in vacuum resulting from opening of valve 732.

When the manual throttle valve 732 is opened a sufficient amount, which may be in the order of one-quarter open, the velocity in the venturi 734 will be sufficient to create a vacuum in excess of one and one-half inches mercury in passage 794 to unseat check valve 796 and thereby actuate diaphragm 758 to fully open the valve 742.

When the manual throttle valve 732 is full open, a full power mixture is provided by engagement of arm 791 with lever 788 to pivot the latter in a counterclockwise direction thereby pulling rod 776 downwardly within its guide 778 against spring 780. As the rod 776 moves downwardly, the pivot point 774 for lever 772 will also be lowered to pivot the lever 772 in a counterclockwise direction through the engagement of arm 770 with the cam surface 768 and open valve 790 in the fuel passage 716 to supply additional fuel to the induction system.

The carburetor 712 illustrated in Fig. 16 is actually only that portion of the carburetor illustrated in Fig. 6 and the fuel passage 714 would correspond to the fuel passage 106 illustrated in Fig. 6. In other words, the carburetor 712 does not supply any appreciable amount of air to the induction system but only that very small amount which is provided by the metering system to regulate the amount of fuel discharged through the metering system. The passage 714 and the fuel passages 716 and 722 therefore may be of very small diameter to further decrease the space adjacent the engine required for the induction system.

Figure 17:
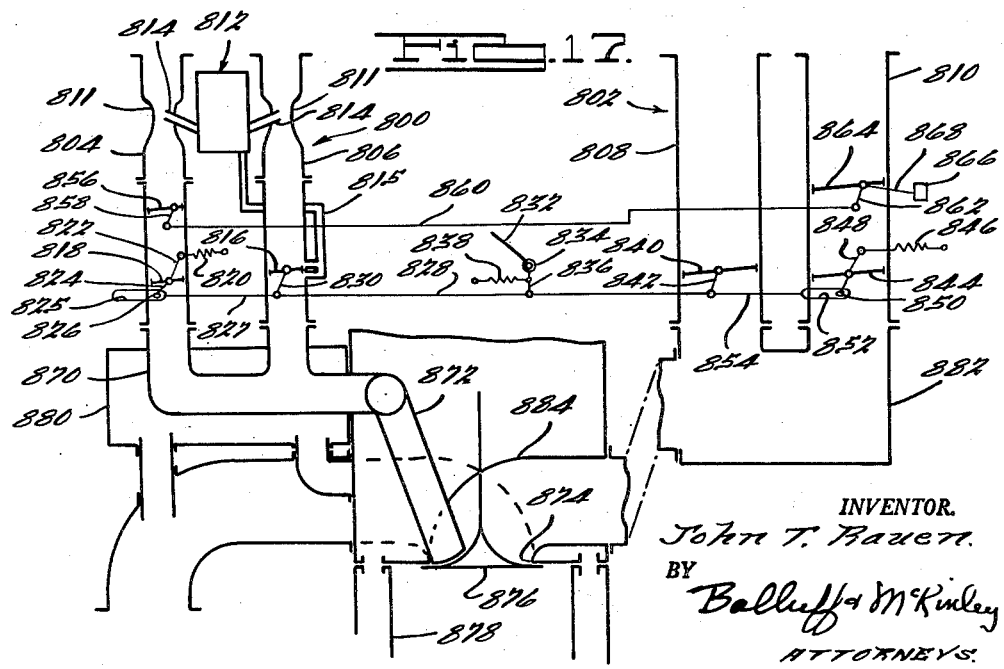
Fig. 17 is a diagrammatic view of a further modification of the invention.

In the modification illustrated in Fig. 17, the heated portion 800 of the induction system includes two separate fuel passages 804 and 806, while the unheated air intake portion 802 includes two separate air passages 808 and 810. Each of the mixture passages 804 and 806 includes a venturi 811, and a plain-tube type carburetor indicated at 812 includes separate fuel nozzles 814, each terminating in the venturi 811 of one of the passages 804, 806. The carburetor 812 further includes an idle fuel system 815 which terminates in small openings located above and below the manually controlled throttle valve 816 in the passage 806. Passage 804 is provided with a manually controlled throttle valve 818 urged toward its closed position by a spring 820 connected to a throttle lever 822 having a second arm 824 provided with a pin 826 received within a slot 825 formed in a link 827 pivotally connected to the accelerator pedal link 828. The throttle valve 816 has a throttle lever 830 which is also pivotally connected to the link 828.

The accelerator pedal 832 has a fixed pivot 834 and an arm 836 pivotally connected to the link 828 and urged in a throttle closing direction by a spring 838.

The air passage 808 in the cold portion 802 of the induction system is provided with a manually controlled throttle valve 840 connected by a throttle lever 842 to the accelerator pedal link 828. The passage 810 is provided with a manually controlled throttle valve 844 urged toward its closed position by a spring 846 connected to one end of a throttle lever 848. The other end of the lever 848 is provided with a pin 850 received within a slot 852 in a link 854 pivotally connected to the throttle lever 842 and to the link 828.

Fuel passage 804 is provided with an unbalanced valve 856 connected by a throttle lever 858 to a link 860, the latter being connected at its other end to the throttle lever 862 of an unbalanced valve 864 located in air passage 810. The valves 856 and 864 are movable in unison and are urged towards their closed position by a weight 866 secured on an arm 868 of the throttle lever 862.

The fuel passages 804 and 806 open into a manifold 870 from which all of the fuel and a small portion of the air required for combustion is supplied to the engine cylinders. A passage 872 leads from manifold 870 to the intake port 874 closely adjacent the intake valve 876 of each cylinder 878, as in the Fig. 1 modification. A part of the exhaust gases are supplied to a heater 880 through which the manifold 870 extends so as to heat the fuel-air mixture supplied through passages 804, 806 to a gaseous state as in the previous modifications.

The lower ends of the air passages 808 and 810 communicate with a manifold 882 from which the major portion of the air required for combustion is supplied to each cylinder through a passage 884 terminating at the intake port 874.

The several throttle valves are illustrated in Fig. 17 in their closed positions for idling engine operation, and at such time fuel will be supplied through the idle fuel passage 815 in response to the engine vacuum below throttle valve 816. From the illustrated idling position of the throttle valves 816 and 840 up to a predetermined degree of opening of such valves, such as three-quarters open, no corresponding movement of valves 818 and 844 will occur, and up to such predetermined degree of opening all of the fuel and air will be supplied through passages 806 and 808, respectively. After valves 816 and 840 have been opened to such predetermined degree, the left-hand end of the slot 825 in link 827 will engage the pin 826, and similarly the pin 850 will be engaged by link 854 to thereafter cause the valves 818 and 844 to open as the manual valves 816 and 840 are moved to their fully opened positions. The throttle levers 824 and 848 may be proportioned so that movement of the manual valves 816 and 840 from such predetermined degree of opening to full open, will fully open valves 818 and 844. As soon as the valves 818 and 844 begin to open, the induction system vacuum will be transmitted to the unbalanced valves 856 and 864 and, if such vacuum is above a predetermined amount, valves 856 and 864 will be opened to admit more fuel and air through passages 804 and 810, respectively. As soon as valves 856 and 864 open, additional fuel and air will be available for higher engine power output.

In the event that the manual throttles 816, 818, 840 and 844 are suddenly opened wide at low engine speeds, the engine vacuum will be sufficient to draw fuel from the nozzle 814 because valves 856 and 864 restrict the mixture and air flow through passages 806 and 810, and in view of the fact that the mixture passage, since it is not required to supply more than a small proportion of the combustion air, may be of very small diameter.

It is to be understood that, while I have illustrated and described in some detail the use of certain specific carburetors and their related metering and fuel supplying systems, other suitable and even conventional carburetors of the type now in use might be employed in an induction system of the type described herein. In general, it may be said that it would be possible to employ any carburetor having a choke, either manually or automatically controlled, and in which the fuel supply system could be made to deliver fuel in response to a vacuum of the order of one inch mercury. Such modification of currently used carburetors would require require little more than suitable enlargement of the fuel passages thereof, and some provision such as a check valve to prevent the idle fuel system used in such carburetors from bleeding excessive amounts of air into the main fuel supply system. The carburetors disclosed in the prior Rauen patents referred to, with certain modifications thereof as previously described, have been disclosed herein to the extent believed necessary for a complete understanding of the present invention, but it is not intended to limit the scope of the invention to the use of any specific carburetor or fuel supplying system or device.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. In an induction system for a reciprocating piston type internal combustion engine having a cylinder, means defining a first passage for conveying a fuel-air mixture to the cylinder, means defining a second passage for conveying air to the cylinder, means for heating said first passage so as to heat said mixture to a gaseous state, a manually controlled throttle valve in said second passage, an automatically operable valve in each of said passages and means connecting said automaticlly operable valve for simultaneous movement, said automatically operable valves being responsive to induction system vacuum so as to be opened in response to an increase in said vacuum.

2. In an induction system for a reciprocating piston type internal combustion engine having a cylinder, means defining a first passage for conveying a fuel-air mixture to the cylinder, means defining a second passage for conveying air to the cylinder, means for heating said first passage so as to heat said mixture to a gaseous state, a manually controlled throttle valve in each of said passages, means connecting said manual throttle valves for simultaneous movement throughout the entire range of engine operation, a second throttle valve in each of said passages, and means connecting said second throttle valves for simultaneous movement, said second throttle valves being responsive to induction system vacuum so as to be opened in response to an increase in said vacuum.

3. In an induction system for a reciprocating piston type internal combustion engine having a cylinder, means defining a first passage for conveying a fuel-air mixture to the cylinder, means defining a second passage for conveying air to the cylinder, means for heating said first passage so as to heat said mixture to a gaseous state, a manually controlled throttle valve in each of said passages, means connecting said manual throttle valves for simultaneous movement throughout the entire range of engine operation, a second throttle valve in each of said passages upstream from said manual throttle valves, and means connecting said second throttle valves for simultaneous movement, said second throttle valves being responsive to induction system vacuum so as to be opened in response to an increase in said vacuum.

4. An induction system according to claim 3 including a vacuum responsive device operably connected to said second throttle valves and means for conducting the induction system vacuum to said device for actuating the same.

5. An induction system according to claim 4 wherein said conducting means includes a first vacuum passage opening into said first passage between the said throttle valves therein, a second vacuum passage opening into said first passage downstream of said manual throttle valve, and a third vacuum passage opening into said first passage upstream from said second throttle valve.

6. An induction system according to claim 5 wherein said second and said third vacuum passages are provided with normally closed check valves.

7. An induction system for a reciprocating piston type internal combustion engine having a cylinder, comprising means defining a first passage for conveying a fuel-air mixture to the cylinder, means defining a second passage for conveying air to the cylinder, means for heating said first passage so as to heat said mixture to a gaseous state, a manually controlled throttle valve in each of said passages, means connecting said manual throttle valves for simultaneous movement throughout the entire range of engine operation, an automatically operable throttle valve in each of said passages upstream from said manual throttle valves, means connecting said second throttle valves for simultaneous movement, fuel supply means for supplying fuel into said first passage, said fuel supply means including an idle fuel passage located between the said throttle valves therein, said automatically operable valves being responsive to the vacuum between the said throttle valves therein and adapted to be opened upon an increase in such vacuum so as to maintain such vacuum at a predetermined value.

8. An induction system for a reciprocating piston type internal combustion engine having a cylinder, means defining a first passage for conveying a fuel-air mixture to the cylinder, means defining a second passage for conveying air to the cylinder, means for heating said first passage so as to heat said mixture to a gaseous state, a manually controlled throttle valve in each of said passages, means connecting said manual throttle valves for simultaneous movement, a second throttle valve in each of said passages, means connecting said second throttle valves for simultaneous movement, said second throttle valves being responsive to induction system vacuum so as to be opened in response to an increase in said vacuum, a single fuel source for supplying all fuel requirements of the engine, means supplying fuel from said single source into said first passage below said second throttle valve therein, said fuel supplying means being operable to supply fuel in response to and at and above a predetermined minimum vacuum in said first passage between the throttle valves therein, and means operable responsive to said vacuum for opening said second throttle valves when said manual throttle valves are closed and said vacuum downstream thereof is above a predetermined maximum amount, so as to reduce the vacuum between said throttle valves to below said predetermined minimum and thereby prevent the flow of fuel into said first passage.

9. In an induction system for an internal combustion engine, means defining a passage for conveying a fuel-air mixture to the engine, a manual throttle valve in said passage, an automatically operable throttle valve in said passage upstream from said manual valve, control means responsive to induction system vacuum and connected to said automatically operable valve for controlling the same in response to said vacuum, said control means being operable to maintain the vacuum between said valves at or above a predetermined minimum vacuum when the vacuum below said manual valve is at or below a predetermined maximum, vacuum responsive fuel supply means for supplying fuel to said passage between said throttle valves whenever the vacuum between said valves is at or above said predetermined minimum, said control means being operable to open said automatically operable valve when said manual valve is closed and the vacuum below said manual valve is above said predetermined maximum, thereby to decrease the vacuum between said valves to less than said minimum and stop the supply of fuel to said passage.

10. In an induction system for an internal combustion engine, means defining a passage for conveying a fuel-air mixture to the engine, a manual throttle valve in said passage, an automatically operable throttle valve in said passage upstream from said manual valve, fuel supply means for supplying fuel to said passage between said throttle valves in response to a predetermined minimum or higher vacuum in said passage between said valves, and means responsive to the induction system vacuum downstream of said manual valve and operable to open said automatically operable valve when said manual valve is closed and the vacuum downstream of said manual valve is above a predetermined maximum, thereby to decrease the vacuum between said valves to an amount less than said minimum vacuum.

11. An induction system for an internal combustion engine having a cylinder and a reciprocating piston therein, comprising means defining a passage communicating with said cylinder and adapted to supply thereto all of the fuel required by said engine throughout its entire operating range, said passage communicating with the atmosphere and adapted to convey air also to said cylinder, said induction system including fuel supply means for supplying fuel to said passage, a throttle valve in said passage for regulating the flow of air through said passage, means within a first region of said passage adapted to vary the pressure therein in accordance with the velocity of air flowing through said passage, said first region having a fluid conducting connection with said fuel supply means for effecting the flow of fuel from said fuel supply means to said passage in accordance with the pressure in said first region only when the pressure therein as determined by said air velocity is below a predetermined pressure, means defining a second region in said passage, said second region having a fluid conducting connection with said fuel supply means for effecting the flow of fuel from said supply means to said passage in response to the existence of a vacuum in said second region, and means responsive to the pressure within said second region of said passage for maintaining sufficient vacuum therein to effect the flow of fuel from said supply means to said passage when the pressure in said first region is above said predetermined pressure.

12. An induction system according to claim 11 wherein said first region of said passage is located upstream therein relative to said second region of said passage.

13. An induction system according to claim 11 wherein said pressure responsive means includes a second throttle valve in said passage, said second throttle valve defining the end of said first region of said passage and the beginning of said second region of said passage.

14. An induction system according to claim 13 wherein the first-mentioned throttle valve is a manually operable valve disposed downstream from said second throttle valve.

15. An induction system according to claim 11 wherein said pressure responsive means includes a second throttle valve, means urging said second throttle valve toward closed position, and a pressure responsive actuating means connected to said second throttle valve and communicating with said second region of said passage downstream from said second throttle valve for urging the latter toward its open position in response to an increase in the vacuum in said second region.

16. An induction system according to claim 15 wherein said urging means and said actuating means cooperate to position said second throttle valve to maintain the vacuum in said second region within predetermined limits during idle engine operation.

17. An induction system according to claim 15 wherein said urging means and said actuating means cooperate to position said second throttle valve to maintain sufficient vacuum in said second region of said passage to supply fuel to said passage whenever the engine speed is below a predetermined minimum speed.

18. An induction system according to claim 11 wherein said pressure responsive means includes a second throttle valve and means urging the same toward closed position, and a pressure responsive actuating means connected to said second throttle valve and communicating with said second region of said passage downstream from said second throttle valve for urging the latter toward its open position in response to an increase in the vacuum in said second region, said first-mentioned throttle valve being manually operable and disposed in said passage downstream from the communication between said actuating means and said second region of said passage.

19. An induction system for an internal combustion engine having a cylinder and a reciprocating piston therein, comprising means defining a passage communicating with said cylinder and adapted to supply thereto all of the fuel required by said engine throughout its entire operating range, said passage communicating with the atmosphere and adapted to convey air also to said cylinder, said induction system including fuel supply means for supplying fuel to said passage, a manually operable throttle valve in said passage for regulating the flow of air through said passage, means defining a pressure modifying region within said passage adapted to vary the pressure therein in accordance with the velocity of air flowing through said passage, said region of said passage having a fluid conducting connection with said fuel supply means for effecting the flow of fuel from said fuel supply means to said passage in accordance with the pressure in said region only when the pressure therein as determined by said air velocity is below a predetermined pressure, a second throttle valve in said passage upstream from said first-mentioned throttle valve, said passage having a second fluid conducting connection with said fuel supply means between said throttle valves for effecting the flow of fuel from said supply means to said passage in response to the existence of a vacuum between said throttle valves, and pressure responsive actuating means connected to said second throttle valve and responsive to the pressure between said throttle valves for automatically positioning said second throttle valve to maintain sufficient vacuum between said valves to effect the flow of fuel from said supply means to said passage when the pressure in said region of said passage is above said predetermined pressure.

20. An induction system according to claim 19 including a communication between said actuating means and said pressure modifying region of said passage for opening said second throttle valve when the pressure in said region is decreased below a predetermined value in response to increased engine speed.

21. An induction system according to claim 20 including a check valve in the communication between said actuating means and said region of said passage.

22. An induction system according to claim 19 including a communication between said actuating means and said passage downstream from said manually operable throttle valve for opening said second throttle valve when said manually operable throttle valve is closed and the vacuum downstream thereof is above predetermined maximum.

23. An induction system according to claim 22 including a check valve in said communication.

24. An induction system according to claim 19 including means urging said second throttle valve toward its closed position, said pressure responsive means communicating with said passage between said throttle valves and tending to open said second throttle valve in response to an increase in the vacuum between said throttle valves.

25. An induction system according to claim 24 including a restriction in the communication between said pressure responsive means and said passage.

26. An induction system according to claim 19 wherein said second throttle valve is of the balanced type.

27. An induction system according to claim 19 including means for limiting the speed of opening movement of said second throttle valve.

28. An induction system according to claim 19 including pump means connected to said second throttle valve and operable upon opening movement thereof for increasing the flow of fuel from said fuel supply means to said passage.

29. An induction system according to claim 28 wherein said pump means includes a passage through which said pump is adapted to pump fuel upon opening of said second throttle valve, and means restricting the flow of fuel through said fuel passage for restricting opening movement of said second throttle valve.

30. An induction system according to claim 29 wherein said pump means comprises a cylinder and a piston reciprocable within said cylinder, said piston including a piston rod and a plurality of rings secured thereon, said rings being of less diameter than the diameter of said cylinder and being spaced apart axially thereof at their outer peripheries, and an annular washer in the space between each adjacent pair of said rings, said washers closely fitting the cylinder and being of less thickness than the spacing between said rings, said washers being freely movable radially relative to said rings whereby said piston is freely movable within said cylinder even though said piston rod is misaligned with the axis of said cylinder.

31. An induction system according to claim 29 wherein said pump means comprises a cylinder and a piston reciprocable within said cylinder, said piston comprising a piston rod and a plurality of annular washers carried by said piston rod and having an outside diameter closely engaging said cylinder, said washers being axially spaced from each other and radially and axially movable relative to said piston rod so that said piston is freely movable within said cylinder.

32. An induction system for an internal combustion engine having a cylinder and a reciprocating piston therein, comprising means defining a passage communicating with said cylinder and adapted to supply thereto all of the fuel required by said engine throughout its entire operating range, said passage communicating with the atmosphere and adapted to convey air also to said cylinder, said induction system including fuel supply means for supplying fuel to said passage, regulating means operably disposed in said passage and adapted to open and close said passage for regulating the flow of fuel and air through said passage, actuating means for imposing a force on said flow regulating means in a direction to open said passage, fuel pumping means connected to said regulating means and adapted to pump fuel into said induction system upon opening of said regulating means, and means comprising a fluid resistance for restricting operation of said pumping means and thereby delaying opening movement of said flow regulating means after actuation thereof by said actuating means.

33. An induction system according to claim 32 wherein said fluid resistance includes a fuel passage through which fuel is pumped by said pumping means and a restriction in said fuel passage for delaying opening of said regulating means in accordance with the resistance offered by said restriction in said fuel passage.

34. An induction system for an internal combustion engine having a cylinder and a reciprocating piston therein, comprising means defining a first passage communicating with said cylinder and through which is supplied all of the fuel required by the engine throughout its entire operating range, said first passage being adapted to convey air also to said cylinder, means defining a second passage adapted to supply air only to said cylinder, said first passage having separate conduits communicating therewith defining first and second air entries to said induction system, said second passage having separate conduits communicating therewith defining third and fourth air entries to said induction system, a first and a second throttle valve operably disposed in said first and second air entries respectively for regulating in part the fluid flow through said first passage, a third throttle valve in said second air entry upstream of said second throttle valve for regulating in part the fluid flow through said first passage, a fourth and a fifth throttle valve operably disposed in said third and fourth air entries respectively for regulating in part the fluid flow through said second passage, a sixth throttle valve in said fourth air entry upstream of said fifth throttle valve for regulating in part the fluid flow through said second passage, means connecting said third and sixth throttle valves for synchronized movement within their respective air entries, means urging said third and sixth throttle valves toward their closed positions, said third and sixth throttle valves being of the unbalanced fluid pressure type and adapted to be opened against the force of said urging means by the flow of fluid through their said air entries, means connecting said first and fourth throttle valves for synchronized movement within their respective air entries, means urging said second and fifth throttle valves toward their closed positions, means connecting said second and fifth throttle valves for synchronized movement, said last-mentioned connecting means being operably connected to said first and fourth throttle valves and arranged to open said second and fifth throttle valves only as said first and fourth throttle valves move through a predetermined last part of their opening movement, and fuel supply means having at least one fuel outlet into each of said first and second air entries.

35. An induction system for an internal combustion engine having a cylinder and a reciprocating piston therein, comprising means defining a passage communicating with said cylinder and adapted to supply thereto all of of the fuel required by said engine throughout its entire operating range, said passage communicating with the atmosphere and adapted to convey air also to said cylinder, said induction system including fuel supply means for supplying fuel to said passage, thermostatic means operable responsive to engine temperatures and cooperable with said fuel supply means for adjusting the latter to supply different fuel-air mixture ratios in accordance with the engine temperature, said thermostatic means including a part connected to said fuel supply means and movable into one position in response to hot engine operating conditions, and detent means cooperable with said part and adapted to maintain the same in said position corresponding to hot engine operation throughout a predetermined range of engine cooling whereby said fuel supply means remains adjusted for hot engine operation until a predetermined amount of cooling of the engine has occurred.

36. An induction system for an internal combustion engine having a cylinder and a reciprocating piston therein, comprising means defining a passage communicating with said cylinder and adapted to supply thereto all of the fuel required by said engine throughout its entire operating range, said passage being adapted to convey air also to said cylinder, said induction system including fuel supply means for supplying fuel to said passage, a manually operable throttle valve in said passage for regulating the flow of air through said passage, a second throttle valve in said passage spaced from said manual throttle valve and operable in response to the pressure in said passage, and control means for adjusting said fuel supply means to supply different fuel-air mixture ratios through said passage, said control means being operable responsive to the position of said manual throttle valve and adapted to adjust said fuel supply means to provide a richer mixture when said manual throttle valve is opened a predetermined amount, independent of the position of said second throttle valve.

37. An induction system for an internal combustion engine having a cylinder and a reciprocating piston therein, comprising a manually operable throttle valve operably disposed in said induction system, a second throttle valve operably disposed in said induction system and operable to throttle said induction system at all engine temperatures, means urging said second throttle valve toward its closed position, pressure responsive means connected to said second throttle valve and operable responsive to the pressure in said induction system to open said second throttle valve, and means connecting said throttle valves in such manner that a predetermined opening movement of said manual throttle valve will produce partial opening movement of said second throttle valve during certain engine operating conditions.

38. An induction system for an internal combustion engine having a cylinder and a reciprocating piston therein, comprising means defining a passage communicating with said cylinder and adapted to supply thereto all of the fuel required by said engine throughout its entire operatable range, said passage communicating with the atmosphere and adapted to convey air also to said cylinder, said induction system including fuel supply means subject to atmospheric pressure and adapted to supply fuel to said passage in response to the existence of less than atmospheric pressure in said passage, a plurality of pressure modifying means within said passage for lessening the pressure therein below atmospheric pressure, means defining a first region in said passage, said first region having a first fluid conducting connection with said fuel supply means, said first region including a first of said pressure modifying means operative responsive to the quantity of air flowing through said passage for effecting the flow of fuel from said supply means to said passage during a first phase of engine operation, means defining a second region in said passage, said second region having a second fluid conducting connection with said fuel supply means, said second region including a second of said pressure modifying means operative responsive to the pressure in said second region for effecting the flow of fuel from said fuel supply means to said passage independent of the supply of fuel by said first pressure modifying means of said first region during phases of engine operation other than said first phase, said second pressure modifying means including a throttle valve operatively disposed in said passage, means defining a third region in said passage and a manually operable throttle valve in said third region for controlling the flow of air to said cylinder during all phases of engine operation.

39. An induction system for an internal combustion engine having a cylinder and a reciprocating piston therein, comprising means defining a passage communicating with said cylinder and adapted to supply thereto all of the fuel required by said engine throughout its entire operating range, said passage communicating with the atmosphere and adapted to convey air also to said cylinder, said induction system including fuel supply means subject to atmospheric pressure for supplying fuel to said passage in response to less than atmospheric pressure therein, pressure modifying means within said passage for lessening the pressure therein below atmospheric pressure, means defining a first region in said passage, said first region having a fluid conducting connection with said fuel supply means, said first region including a first of said modifying means operative responsive to the quantity of air flowing through said passage for effecting the flow of fuel from said supply means to said passage during a first phase of engine operation, means defining a second region in said passage, said second region having a fluid conducting connection with said fuel supply means, said second region including a second of said pressure modifying means operative responsive to the pressure in said second region and adapted to maintain the pressure within said passage in said second region such that the quantity of fuel supplied to said passage in response to said such pressure is supplied independent of the pressure in said first region during phases of engine operation other than said first phase, said second pressure modifying means including a throttle valve operatively disposed in said passage, means defining a third region in said passage, and a manually operable throttle valve in said third region of said passage for controlling the flow of air to said cylinder during all phases of engine operation.

40. An induction system for an internal combustion engine having a cylinder and a reciprocating piston therein, comprising means defining a passage communicating with said cylinder and adapted to supply thereto all of the fuel required by said engine throughout its entire operatable range, said passage communicating with the atmosphere and adapted to convey air also to said cylinder, said induction system including fuel supply means subject to atmospheric pressure and adapted to supply fuel to said passage in response to the existence of less than atmospheric pressure in said passage, a plurality of pressure modifying means within said passage for lessening the pressure therein below atmospheric pressure, means defining a first region in said passage, said first region having a fluid conducting connection with said fuel supply means, said first region including a first of said pressure modifying means operative responsive to the quantity of air flowing through said passage for effecting the flow of fuel from said supply means to said passage during a first phase of engine operation, means defining a second region in said passage, said second region having a fluid conducting connection with said fuel supply means, said second region including a second of said pressure modifying means operative responsive to the pressure in said second region for effecting the flow of fuel from said fuel supply means to said passage, said second pressure modifying means including a throttle valve operatively disposed in said passage, one end of said last-mentioned fluid conducting connection opening into said passage on the downstream side of said throttle valve when said valve is in its closed position, means defining a third region controlling the flow of air to said cylinder during all phases of engine operation.

41. An induction system for an internal combustion engine having a cylinder and a reciprocating piston therein, comprising means defining a passage communicating with said cylinder and adapted to supply thereto all of the fuel required by said engine throughout its entire operatable range, said passage communicating with the atmosphere and adapted to convey air also to said cylinder, said induction system including fuel supply means subject to atmospheric pressure and adapted to supply fuel to said passage in response to the existence of less than atmospheric pressure in said passage, a plurality of pressure modifying means within said passage for lessening the pressure therein below atmospheric pressure, means defining a first region in said passage, said first region having a fluid conducting connection with said fuel supply means, said first region including a first of said pressure modifying means operative responsive to the quantity of air flowing through said passage for effecting the flow of fuel from said supply means to said passage during a first phase of engine operation, means defining a second region in said passage, said second region having a fluid conducting connection with said fuel supply means and including a second of said pressure modifying means operative responsive to the pressure in said second region, said second pressure modifying means including a throttle valve operatively disposed in said passage, means for closing said throttle valve, opening means adapted to overrule said closing means and operative responsive to the pressure in said second region for maintaining a predetermined pressure in said second region for effecting a flow of fuel from said fuel supply means to said passage sufficient to sustain engine operation, said first region being separate from said second region, means defining a third region controlling the flow of air to said cylinder during all phases of engine operation.

42. An induction system for an internal combustion engine having a cylinder and a reciprocating piston therein, comprising means defining a passage communicating with said cylinder and adapted to supply thereto all of the fuel required by said engine throughout its entire operatable range, said passage communicating with the atmosphere and adapted to convey air also to said cylinder, said induction system including fuel supply means subject to atmospheric pressure and adapted to supply fuel to said passage in response to the existence of less than atmospheric pressure in said passage, a plurality of pressure modifying means within said passage for lessening the pressure therein below atmospheric pressure, means defining a first region in said passage, said first region having a fluid conducting connection with said fuel supply means, said first region including a first of said pressure modifying means operative responsive to the quantity of air flowing through said passage for effecting the flow of fuel from said supply means to said passage during a first phase of engine operation, means defining a second region in said passage, said second region including a second of said pressure modifying means operative responsive to the pressure in said second region for effecting the flow of fuel from said fuel supply means to said passage, said second pressure modifying means including a throttle valve, means defining a third region in said passage controlling the flow of air to said cylinder during all phases of engine operation, said second region being independent of said first and third regions.

43. An induction system for a reciprocating piston type internal combustion engine having a cylinder provided with an intake port and an intake valve for opening and closing said port, comprising means defining a first passage for conveying a fuel-air mixture to said cylinder, means defining a second passage for conveying air only to said cylinder, said first and second passages both terminating at said intake port and originating in a higher pressure region to obtain unidirectional flow through said passages throughout the entire range of engine operation, fuel supply means adapted to supply all of the fuel required by said engine to said first passage in response to the pressure therein throughout the entire range of engine operation, means within said first passage defining a pressure regulating region adapted to vary the pressure therein in accordance with the velocity of the air flowing through said first passage, said fuel supply means having a fuel outlet into said region of said first passage, said pressure regulating region being adapted to regulate the quantity of fuel supplied through said outlet in accordance with the quantity of air flowing through said first passage, said first and second passages each having a throttle valve therein for controlling the quantity of said fuel-air mixture and the air supplied to said cylinder, said throttle valves being operably connected for synchronized movement and arranged so that the fluid flow capacities of said passages, as determined by less-than-full-open positions of said throttle valves, are maintained in a substantially constant ratio to obtain a substantially uniform ratio of air to fuel-air mixture during engine operation with said throttle valves in any less-than-full-open position, said intake port and intake valve being generally circular and said valve having an operating stem projecting from the surface thereof remote from said cylinder, said intake port constituting the termination of said second passage, the termination of said first passage comprising a tubular passage member projecting toward and terminating within the peripheral extend of said intake port, the end of said tubular member being at one side of said valve operating stem and closely spaced from said surface of said intake valve when the latter is in its closed position to substantially prevent flow of said fuel-air mixture from said tubular member into said second passage.

44. An induction system for a reciprocating piston type internal combustion enginge having a cylinder, comprising means defining a first pasage for conveying a fuel-air mixture to said cylinder, means defining a second passage for conveying air only to said cylinder, said first and second passages both terminating in a low pressure region and originating in a higher pressure region to obtain unidirectional flow through said passages throughtout the entire range of engine operation, fuel supply means adapted to supply all of the fuel required by said engine to said first passage in response to the pressure therein throughout the entire range of engine operation, means within said first passage defining a pressure regulating region adapted to vary the pressure therein in accordance with the velocity of the air flowing through said first passage, said fuel supply means having a fuel outlet into said region of said passage, said pressure regulating region being adapted to regulate the quantity of fuel supplied through said outlet in accordance with the quantity of air flowing through said first passage, said first and second passages each having a throttle valve therein for controlling the quantity of said fuel-air mixture and the air supplied to said cylinder, said throttle valves being operably connected for synchronized movement and arranged so that the fluid flow capacities of said passages are maintained in a substantially constant ratio to obtain a substantially uniform ratio of air to fuel-air mixture throughout the entire range of engine operation, said first passage having a portion thereof subjected to the heat of said cylinder, means for heating the fuel flowing through said passage before the fuel reaches said portion of said first passage, said heating means being adapted to heat the fuel to a gaseous state such that the flow characteristics of the gaseous fuel approximate the flow characteristics of the air flowing through said first passage, and control means operable responsive to engine operating conditions for regulating the amount of heat supplied by said heating means so as to maintain said first passage at a temperature high enough to heat the fuel to said gaseous state under all engine operating conditions.

45. An induction system according to claim 44 wherein said heating means is adapted to heat the air in said first passage before the same reaches said fuel outlet into said first passage to such temperature that the temperature of said fuel-air mixture is above the freezing point of the water normally contained in the air to prevent icing in the region of the throttle valve in said first passage.

46. In induction system according to claim 44 wherein said heat control means includes a thermostat responsive to engine temperatures.

47. In an internal combustion engine having multiple cylinders each having an intake port and valve therefor and a reciprocating piston therein, said engine being adapted to burn gasoline or equivalent liquid hydrocarbon fuels of equal or greater volatility during all engine operation; an induction system adapted to improve the efficiency and performance of such an engine by equalizing the distribution of fuel and air to the several cylinders of the engine, said induction system including a fuel supply system comprising a first intake manifold, means defining a first passage for supplying a fuel-air mixture to said first manifold and mixture distributing passages for supplying said fuel-air mixture from said first manifold to each of said cylinders, said induction system also including an air supply system comprising a second intake manifold, means defining a second passage for supplying air to said second intake manifold and air distributing passages for supplying air from said second manifold to each of said cylinders, said air supply system having a flow capacity substantially greater than the flow capacity of said fuel supply system when the two systems are subjected to equal pressures, the mixture distributing passage and the air distributing passage for each cylinder terminating at the intake port of said cylinder, a carburetor for supplying fuel to said first passage, a throttle valve in each of said first and second passages, means connecting said throttle valves for synchronous movement so as to maintain the ratio of the flow capacity of said fuel supply system to the flow capacity of said air supply system at a substantially constant value, and means for applying sufficient heat to said first passage, said first intake manifold and said mixture distributing passages to heat said fuel-air mixture therein to a gaseous state such that the flow characteristics of said fuel approximate the flow characteristics of the air with which the fuel is mixed so that under any engine operating condition the cylinders, at each intake stroke of their pistons, receive from said fuel supply system equal amounts of a fuel-air mixture of the same richness as established by said carburetor and receive from said air supply system equal amounts of air whereby each cylinder receives a final ignitable mixture of fuel and air of predetermined proportions.

48. In an internal combustion engine having multiple cylinders each having an intake port and valve therefor and a reciprocating piston therein, said engine being adapted to burn gasoline or equivalent liquid hydrocarbon fuels of equal or greater volatility during all engine operation; an induction system adapted to obtain better efficiency and performance than can be obtained from an engine of the type described having a single source of fuel supply and a single intake passage for all of the fuel and air supplied to the engine, said better efficiency and performance of the engine being obtained by improving the distribution of fuel and air to the several cylinders of the engine, said induction system including a fuel supply system comprising a first intake manifold, means defining a first passage for supplying a fuel-air mixture to said first intake manifold and mixture distributing passages for supplying said fuel-air mixture from said first manifold to each of said cylinders, said induction system also including an air supply system comprising a second intake manifold, means defining a second passage for supplying air to said second intake manifold and air distributing passages for supplying air from said second manifold to each of said cylinders, said air supply system having a substantially greater flow capacity than said fuel supply system when the pressures in the two systems are equal, the mixture distributing passage and the air distributing passage for each cylinder terminating at the intake port of said cylinder, a carburetor for supplying fuel to said first passage, a throttle valve in each of said first and second passages, means connecting said throttle valves for synchronous movement so as to maintain the ratio of the flow capacity of said fuel supply system to the flow capacity of said air supply system at a substantially constant value, and means for applying sufficient heat to said first passage, said first intake manifold and said mixture distributing passages to heat said fuel-air mixture therein to a gaseous state such that the flow characteristics of said fuel approximate the flow characteristics of the air with which the fuel is mixed so that under any engine operating condition the cylinders, at each intake stroke of their pistons, receive from said fuel supply system equal amounts of a fuel-air mixture of the same richness as established by said carburetor and receive from said air supply system equal amounts of air whereby each cylinder receives a final ignitable mixture of fuel and air of predetermined proportions which closely approximates the leanest final mixture which will support combustion during less than full open throttle engine operation and which final mixture is no richer than the minimum required for full power output at any engine speed.

References Cited in the file of this patent

UNITED STATES PATENTS

| | | |
|---|---|---|
| 1,122,038 | Smith | Dec. 22, 1914 |
| 1,245,509 | Riotte | Nov. 6, 1917 |
| 1,245,511 | Riotte | Nov. 6, 1917 |
| 1,245,519 | Smith | Nov. 6, 1917 |
| 1,578,382 | Bannister | Mar. 30, 1926 |
| 1,770,428 | Petit | July 15, 1930 |
| 1,834,198 | Asettene | Dec. 1, 1931 |
| 1,867,457 | Ishikawa | July 12, 1932 |
| 2,134,889 | Phillips | Nov. 1, 1938 |
| 2,293,842 | Mallory | Aug. 25, 1942 |
| 2,296,172 | Mallory | Sept. 15, 1942 |
| 2,324,592 | Olson | July 20, 1943 |
| 2,440,572 | Brandenburg et al. | Apr. 27, 1948 |
| 2,588,136 | Mallory | Mar. 4, 1952 |
| 2,694,559 | Gordon et al. | Nov. 16, 1954 |
| 2,698,613 | Jagersberger | Jan. 4, 1955 |
| 2,804,862 | Nedwidek | Sept. 3, 1957 |
| 2,864,596 | Dermond | Dec. 16, 1958 |

FOREIGN PATENTS

| | | |
|---|---|---|
| 255,903 | Italy | Nov. 22, 1927 |